(12) United States Patent
Kuhl

(10) Patent No.: US 10,526,670 B2
(45) Date of Patent: Jan. 7, 2020

(54) BLAST FURNACE AND METHOD FOR OPERATING A BLAST FURNACE

(71) Applicant: CCP TECHNOLOGY GMBH, Munich (DE)

(72) Inventor: Olaf Kuhl, Greifswald (DE)

(73) Assignee: CCP TECHNOLOGY GMBH, Munich (DE)

( * ) Notice: Subject to any disclaimer, the term of this patent is extended or adjusted under 35 U.S.C. 154(b) by 561 days.

(21) Appl. No.: 14/955,105

(22) Filed: Dec. 1, 2015

(65) Prior Publication Data

US 2016/0083810 A1   Mar. 24, 2016

Related U.S. Application Data

(63) Continuation-in-part of application No. PCT/EP2014/061725, filed on Jun. 5, 2014.

(30) Foreign Application Priority Data

Jun. 14, 2013   (DE) .................. 10 2013 009 993

(51) Int. Cl.
*C21B 5/06* (2006.01)
*C01B 32/40* (2017.01)
(Continued)

(52) U.S. Cl.
CPC .............. *C21B 5/06* (2013.01); *C01B 32/40* (2017.08); *C21B 7/002* (2013.01); *F27B 1/10* (2013.01);
(Continued)

(58) Field of Classification Search
CPC ....... C21B 5/06; C21B 7/002; C21B 2100/04; C21B 2100/06; C21B 2100/22; C21B 2100/24; C01B 32/40; C10J 2300/1609
See application file for complete search history.

(56) References Cited

U.S. PATENT DOCUMENTS

| 2,598,735 A | 6/1952 | Webb |
| 2,790,711 A * | 4/1957 | Sellers et al. ........... C21B 5/001 266/156 |

(Continued)

FOREIGN PATENT DOCUMENTS

| EP | 0931840 | 1/1999 |
| EP | 2543743 | 1/2013 |

(Continued)

OTHER PUBLICATIONS

Lundgren, J. et al. "Methanol production from steel-work off-gases and biomass based synthesis gas." Applied Energy. vol. 112 , pp. 431-439. Available online on Apr. 4, 2013. (Year: 2013).*

(Continued)

*Primary Examiner* — Tima M. McGuthry-Banks
(74) *Attorney, Agent, or Firm* — Tarolli, Sundheim, Covell & Tummino LLP

(57) ABSTRACT

The present blast furnace and method for operating a blast furnace are able to reduce $CO_2$ production and the amount of applied additives and heating material. The method for metal production of metal ores comprising the following steps: reducing a metal ore, particularly a metal oxide, and thereby producing furnace gas containing $CO_2$ in a blast furnace shaft; discharging the furnace gas from the blast furnace shaft; directing at least a portion of the furnace gas into a $CO_2$ converter and reducing the $CO_2$ in the furnace gas into CO; directing at least a portion of the CO from the $CO_2$ converter into the blast furnace shaft. The method produces CO as a gaseous reduction agent which may be easily introduced into the blast furnace shaft. Further, a blast furnace for metal production by reducing a metal ore designed for operating according to the method is described.

29 Claims, 6 Drawing Sheets

(51) Int. Cl.
*C21B 7/00* (2006.01)
*F27B 1/10* (2006.01)
*F27D 17/00* (2006.01)

(52) U.S. Cl.
CPC ......... *F27D 17/001* (2013.01); *F27D 17/008* (2013.01); *C21B 2100/22* (2017.05); *C21B 2100/282* (2017.05); *C21B 2100/62* (2017.05); *Y02P 10/122* (2015.11); *Y02P 10/128* (2015.11); *Y02P 10/265* (2015.11); *Y02P 10/283* (2015.11)

(56) References Cited

U.S. PATENT DOCUMENTS

| | | | | |
|---|---|---|---|---|
| 3,814,404 | A * | 6/1974 | Claflin | C21B 5/001 266/156 |
| 3,884,677 | A * | 5/1975 | Wenzel | C21B 5/06 75/462 |
| 3,909,446 | A | 9/1975 | Miyashita et al. | |
| 6,203,594 | B1 | 3/2001 | Hille | |
| 2008/0299650 | A1* | 12/2008 | Krieg | C12M 21/12 435/298.1 |
| 2013/0203142 | A1* | 8/2013 | Young | C10K 1/002 435/161 |
| 2014/0130639 | A1* | 5/2014 | Baldauf | C21B 5/06 75/392 |
| 2014/0306386 | A1* | 10/2014 | Bartol | C21B 5/00 266/44 |
| 2014/0364516 | A1* | 12/2014 | Kuhl | C01B 32/40 518/704 |

FOREIGN PATENT DOCUMENTS

| | | | |
|---|---|---|---|
| GB | 1247417 | | 9/1971 |
| WO | WO-2009-064201 | A * | 5/2009 |
| WO | 2010049536 | | 5/2010 |
| WO | 2011087036 | | 7/2011 |
| WO | WO-2011087036 | A1 * | 7/2011 ........... B01D 53/326 |

OTHER PUBLICATIONS

Daniell, James; Michael Kopke & Sean Dennis Simpson. "Commercial Biomass Syngas Fermentation: Reveiw." Energies 5 pages 5372-5417. (Year: 2012).*

Liu, Kan. "Production of Alcohols via Syngas Fermentation Using Alkalibaculum bacchi Monoculture and a Mixed Culture." Dissertation, Oklahoma State University. (Year: 2013).*

* cited by examiner

BLAST FURNACE AND METHOD FOR OPERATING A BLAST FURNACE

RELATED APPLICATIONS

This application is a Continuation-in-Part of PCT International Application Serial No. PCT/EP2014/061725, filed on Jun. 5, 2014, which claims priority from German Patent Application Serial No. DE 10 2013 009 993.5, filed on Jun. 14, 2013. These applications are hereby incorporated by reference in their entireties.

FIELD OF THE INVENTION

The present invention relates to a blast furnace and a process for operating a blast furnace, which may be employed for reducing $CO_2$ emissions.

BACKGROUND

Metallurgical plants are plants for processing metal ore, wherein the central element of such a metallurgical plant is a blast furnace. These metallurgical plants have been known for a long time. A blast furnace is fed with raw materials which comprise metal ore, additives and heating material. Usually coal or coke is used as a heating material, wherein coal and coke produce heat by burning in the presence of air on the one hand and wherein coal and coke also function as reduction agent for the metal ore, as the metal ore is basically comprised of metal oxide. When reducing metal ore in a blast furnace, various gases are produced, which collectively are known as a furnace gas or flue gas. Said furnace gas usually contains a substantial amount of carbon dioxide ($CO_2$). Carbon dioxide is a greenhouse gas, and during recent years more and more effort has been made to avoid or convert greenhouse gases, as these greenhouse gases are regarded as detrimental for the climate.

In the field of metal production, it is a general aim to use as few raw materials and heating materials as possible, as these materials are expensive and it is expensive to transport these materials. Much effort has been made to reduce the amount of coke/coal used in production. One approach was blowing coal dust into the blast furnace, and another approach was producing carbon monoxide as a reduction gas, either in the blast furnace itself or in a separate gasification reactor outside the blast furnace. From EP 09318401 A1 it is known to blow a portion of the carbon required for reducing the metal ore into the blast furnace in form of a substitute reduction material. In this sense, e.g. natural gas, heavy oil, fine coal and similar material having a high carbon content may be used as a substitute reduction material. These materials may be directly blown into the blast furnace shaft or may be gasified outside of the blast furnace shaft in a separate gasification reactor so as to form a reduction gas. Subsequently, such a reaction gas may be directed into the blast furnace shaft. The method known from EP 09318401 A1 may provide a possibility to reduce the consumed amount of coal or coke and may also provide a possibility to use materials, which are difficult to process as a substitute reduction material, however, the problem of high $CO_2$ production in metal production has not been solved.

The prior art discloses methods wherein furnace gas or a particular component thereof is directed out of the blast furnace shaft and, after being processed in a $CO_2$ converter, is re-directed into the blast furnace shaft. EP 2 543 743 A1 discloses a method wherein furnace gas is directed out of the blast furnace shaft and is directed to a separation device in which CO and $CO_2$ are separated. Only the separated $CO_2$ is subjected to reforming in a $CO_2$ converter. Reforming produces mainly CO and $H_2O$, wherein $H_2O$ is separated and CO is directed into the blast furnace shaft. WO 2011/087036 A1 also discloses a method wherein first furnace gas is directed to a separation device in which CO and $CO_2$ are separated. In a $CO_2$ converter, the $CO_2$ is converted into $O_2$ and CO. The CO from said conversion and the previously separated CO are jointly directed into the blast furnace shaft. U.S. Pat. No. 3,909,446 A discloses a method wherein furnace gas from a blast furnace shaft is mixed with coke oven gas in a $CO_2$ converter. Thus, a gas mixture comprising CO and $H_2$ is produced which is ro-directed into the blast furnace shaft. WO 2010/049536 A1 describes a similar method wherein also carbon containing particles are re-directed into the blast furnace shaft. U.S. Pat. No. 2,598,735 A discloses a method wherein furnace gas from a blast furnace shaft is mixed with carbon/coal and oxygen in a gas generator. A portion of the carbon is burnt in presence of the oxygen, and another portion of the carbon reduces the $CO_2$ from the furnace gas and the $CO_2$ from the burnt carbon to CO. Said CO is re-directed into the blast furnace shaft as a reducing agent. None of these documents discloses a method wherein further processing of a portion of the converted CO is carried out.

SUMMARY

The present invention is directed to a blast furnace and a process for operating a blast furnace, which are able to reduce the $CO_2$ production as well as to reduce the amount of consumed additives and heating material when compared to presently used metal production plants.

This problem is solved by a method for processing metal ore according to claim 1 and by a blast furnace according to claim 17.

The method for processing metal ore disclosed herein comprises the following steps: reducing a metal ore, particularly reducing metal oxides; producing a furnace gas in a blast furnace shaft, wherein the furnace gas contains $CO_2$; and discharging the furnace gas from the blast furnace shaft; directing at least a portion of the furnace gas directly or indirectly to a $CO_2$ converter and reducing the $CO_2$ contained in the furnace gas in said $CO_2$ converter so as to produce CO; and directing at first portion of said CO from the $CO_2$ converter into the blast furnace shaft. This method solves the above identified problem and also produces CO as a gaseous reduction material, which may be easily fed into the blast furnace shaft. Further, a second portion of the CO is directed from the $CO_2$ converter to the further processing process. Depending on the type of $CO_2$ converter, the step of converting $CO_2$ into CO produces more CO than necessary for reducing metal ore in the blast furnace shaft. The additionally produced CO may be used as feed stock or energy carrier in the further processing process.

According to one embodiment of the method, the second portion of the CO from the $CO_2$ converter is first burned so as to form an exhaust gas mixture containing $CO_2$ before it is directed in form of said exhaust gas mixture into a further processing process. In this way, the CO may be used as an energy carrier. Depending on the type of the further processing process, it may be desirable, to have the $CO_2$ as a feed stock or raw material.

According to another embodiment of the method, wherein the furnace gas is indirectly routed to the $CO_2$ converter, the furnace gas is first burned so as to form an exhaust gas mixture containing $CO_2$, before it is directed into the $CO_2$ converter in form of said exhaust gas mixture. In the $CO_2$ converter, the $CO_2$ is reduced to CO. Thus, the CO contained in the furnace gas and other combustible components of the furnace gas may be used as an energy carrier.

Depending on the type of the further processing process, it may be advantageous to direct a portion of the exhaust gas mixture containing $CO_2$ not through the $CO_2$ converter but to a further processing process, wherein the $CO_2$ may serve as raw material or feed stock in said further processing process.

In one embodiment of the method, a portion of the furnace gas is directly routed to a further processing process, i.e. bypassing the $CO_2$ converter. Thus, a higher amount of $CO_2$ may be provided to the further processing process. It is also possible to set a desired ratio of CO content to $CO_2$ content in a gas mixture for the further processing process.

Preferably, a portion of the CO is injected in a lower region of the blast furnace shaft above the level of the molten metal, particularly in a region of the blast nozzles or tuyeres. Thus, CO may be injected into the reduction zone of the blast furnace shaft as a gaseous reduction material. Furthermore, when retrofitting or adapting an existing blast furnace for the method of the present disclosure, the tuyeres, that are already present, may be used as CO inlets.

A portion of the CO may preferably be injected at one or more CO inlets along the height of the blast furnace shaft. Thus, the location of the different zones of the blast furnace shaft may be controlled, and the metal production may be precisely controlled.

The CO inlets may optionally be located partially below the level of the molten metal in the blast furnace shaft. Thus, even reduction of the molten metal may be achieved.

In one embodiment of the method, additional carbon may be introduced in the lower region of the blast furnace shaft so as to come into contact with the molten metal. Thus, the melting point of the metal may be lowered.

In one embodiment of the disclosed method, the step of reducing $CO_2$ to CO in the $CO_2$ converter is carried out by addition of C at a temperature between 800 and 1700° C. Under these conditions a Boudouard equilibrium may be achieved, where a high proportion of the introduced $CO_2$ is converted into CO.

According to one embodiment of the disclosed method, the further processing process is one of the following a) a combustion process in a gas engine or a gas turbine; b) an oxidation process in a fuel cell. By means of such processes, heat or mechanical energy may be obtained from the combustible CO gas.

According to another embodiment of the disclosed method, the further processing process is a biological conversion process in a bio converter, wherein said biological conversion process is carried out by using microbes or algae according to one or more of the following net equations:

$$6CO + 3H_2O \rightarrow C_2H_5OH + 4CO_2; \quad a)$$

$$6H_2 + 2CO_2 \rightarrow C_2H_5OH + 3H_2O; \quad b)$$

$$2CO + 4H_2 \rightarrow C_2H_5OH + H_2O. \quad b)$$

In this way, CO and particularly the undesirable $CO_2$ may be converted into Ethanol by addition of hydrogen. Also kerosene, Diesel, gasoline, methanol or other fuels may be produced if appropriate microbes and algae are chosen. In this embodiment the further processing process is a biological conversion process in a bio converter. By use of microbes or algae, the introduced gases CO and $CO_2$ are converted into kerosene, diesel, gasoline, methanol or other fuels as an end product.

In case the further processing process is a biological conversion process, the disclosed method preferably comprises the following steps: decomposing a hydrocarbon containing fluid into carbon and hydrogen a) by means of a plasma or b) by introducing thermal energy, wherein the step of decomposing is preferably carried out in a separate hydrocarbon converter; and directing the hydrogen ($H_2$) to the biological conversion process. In this way, hot carbon is provided for reducing the $CO_2$ contained in the furnace gas or in the exhaust gas mixture of the combustion machine at the Boudouard equilibrium. Furthermore, considerable amounts of hydrogen are produced which facilitates that the biological conversion process produces a large amount of ethanol and little or no $CO_2$.

According to another embodiment of the disclosed method the further processing process is a conversion process, in which a synthesis gas is converted into a functionalised and/or non-functionalised hydrocarbon, preferably into paraffin, kerosene, Diesel, gasoline, liquid gases or methanol. In this way, a vendible product may be produced from the CO gas, which is produced in great amounts.

In the embodiment of the disclosed method, in which the further processing process is a conversion process for converting a synthesis gas, the synthesis gas is preferably produced by the following steps: decomposing a hydrocarbon containing fluid into carbon (C) and hydrogen ($H_2$) a) by means of plasma or b) by means of introducing thermal energy; and mixing at least a portion of said hydrogen ($H_2$) with at least a portion of the CO produced in the $CO_2$ converter. In this way great amounts of hydrogen may be provided. Preferably, the hydrocarbon containing fluid is an inexpensive fluid, such as $CH_4$, crude oil or other heavy oils.

In the disclosed method, the mass flows of furnace gas, exhaust gas, C, CO gas, $H_2$ gas, $CO_2$ gas may be ideally utilized if a plurality of different further processing processes is carried out.

In an alternative form of the disclosed method, the step of reducing $CO_2$ to CO in the $CO_2$ converter occurs by means of a Reverse-Water-Shift reaction according to the equation $CO_2 + H_2 \rightarrow CO + H_2O$. In this way, the $CO_2$ emission of the blast furnace process may be reduced, and this alternative form does not produce additional mass flow of CO gas.

In one embodiment, the blast furnace shaft and/or the $CO_2$ converter may be additionally heated. In the disclosed method, heating of the blast furnace shaft by means of coke/coal may be reduced or even avoided. Therefore, the thermal energy in the blast furnace shaft may not be sufficient for achieving sufficiently high temperatures in every situation. By means of additional heating, higher temperatures may be achieved, i.e. temperatures required for reducing metal ore and for melting said metal.

Additional heating is preferably carried out at least partially by means of heat produced in one of the above mentioned combustion steps and/or by means of heat produced in one of the above mentioned steps of decomposing a hydrocarbon containing fluid into carbon (C) and hydrogen ($H_2$) a) by means of a plasma or b) by introducing thermal energy and/or additional heating is carried out by means of heat produced during conversion of CO or synthesis gas into functionalised or non-functionalised hydrocarbons. In this way, the heat produced during the decomposition step may be utilized in a process step onsite which has a constant demand for heat energy. Accordingly the heat energy is not wasted.

The blast furnace for metal production described herein comprises: a blast furnace shaft having a first furnace gas outlet and at least one CO inlet; a $CO_2$ converter for reducing $CO_2$ to CO, the $CO_2$ converter comprising a $CO_2$ converter inlet and a $CO_2$ converter gas inlet for gases containing $CO_2$; wherein the furnace gas outlet is directly or indirectly connected to the $CO_2$ converter gas inlet; and wherein the $CO_2$ converter comprises at least one first CO outlet for discharging a first portion of the CO produced in the $CO_2$ converter, wherein the first CO outlet is directly or indirectly connected to the blast furnace shaft. This blast furnace solves the above mentioned problem and, further, is able to produce CO as a gaseous reduction material which may be easily fed into the blast furnace shaft. Further, the $CO_2$ converter comprises at least one second CO outlet for discharging a second portion of the CO to a further processing converter. Depending on the type of $CO_2$ converter, the conversion of $CO_2$ results in having more CO than is necessary for reduction of metal ore in the blast furnace shaft. The additionally produced CO may accordingly be diverted as a second portion of CO, and said second portion of CO may be used in a further processing process as a feed stock or energy carrier.

According to one embodiment, the blast furnace further comprises a combustion machine having a combustion gas inlet and at least one exhaust gas outlet for discharging an exhaust gas mixture containing $CO_2$. At least one of the second CO outlets of the $CO_2$ converter is connected to the combustion gas inlet of the combustion machine. The combustion machine is operated at least partially with CO coming from the $CO_2$ converter. One of the exhaust outlets of the combustion machine is connected to a further processing converter. In the combustion machine, the CO produced in the $CO_2$ converter may be used as an energy carrier. Depending on the type of the further processing process, it may be desirable to provide an exhaust gas mixture from the combustion machine, wherein the $CO_2$ is used as feed stock for the further processing process.

In one embodiment, the blast furnace also comprises a combustion machine having a combustion gas inlet and at least one exhaust gas outlet for discharging an exhaust gas mixture containing $CO_2$. This embodiment comprises an indirect connection of the furnace gas outlet and the $CO_2$ converter, and the first furnace gas outlet of the blast furnace shaft is connected to the combustion gas inlet of the combustion machine. The combustion machine is at least partially operated with the furnace gas. Thus, the CO and other combustible components of the furnace gas may be used as an energy carrier. In this embodiment, preferably one of the exhaust outlets of the combustion machine is connected to the $CO_2$ converter gas inlet of the $CO_2$ converter so as to direct a portion of the exhaust gas mixture containing $CO_2$ into the $CO_2$ converter.

Depending on the type of the further processing process, it may be advantageous that one of the exhaust outlets of the combustion machine is connected to the further processing converter so as to direct a portion of the exhaust gas mixture containing $CO_2$ past the $CO_2$ converter, i.e. not through the $CO_2$ converter, and into the further processing process. In this way, a greater amount of $CO_2$ may be provided for the further processing process. It is also possible to adjust a gas mixture having a desired ratio of CO to $CO_2$ adapted for the further processing process.

When reducing $CO_2$ contained in the furnace gas or in the exhaust gas of the combustion machine in the $CO_2$ converter by means of C, it is preferred to connect at least one of the second CO outlets of the $CO_2$ converter to a further processing converter. In the further processing converter, the portions of produced CO, which cannot be redirected into the blast furnace shaft and accordingly cannot be consumed in the blast furnace shaft, may be converted into heat, into mechanical power or into sellable products. The heat and/or the mechanical power may be used for operating the blast furnace. The products may be sold.

Depending on the type of the further processing process, it may be advantageous that the furnace comprises a second furnace gas outlet, which is directly connected to the further processing converter, i.e. having a connection bypassing the $CO_2$ converter. The furnace gas contains CO and $CO_2$ components, wherein these components may be particularly further processed in a further processing converter having a biological principle.

Preferably, the blast furnace comprises a CO inlet in a lower region of the blast furnace shaft above the level of the molten material, particularly in a region of the blast nozzles or tuyeres. In this way, the CO may be injected into the reduction zone of the blast furnace shaft as a gaseous reduction material. If an existing furnace is retrofitted for the presently disclosed method, the already existing tuyeres may be used as CO inlets.

The furnace preferably comprises a plurality of CO inlets at different heights of the blast furnace shaft. Thus, CO gas may be injected into different regions along the height of the blast furnace shaft. Thus, the location of the different zones of the blast furnace shaft may be controlled and the metal production may be easily controlled.

Optionally, the CO inlets may be partially located at a height which is below the level of the molten metal in the blast furnace shaft during the operation of the furnace. Accordingly, reduction may be also achieved in the molten metal, if necessary.

Furthermore, the blast furnace optionally comprises a C inlet for carbon in the lower region of the blast furnace shaft, wherein the C inlet is located in such a way that carbon (C) may be fed into the blast furnace shaft below the level of the molten metal during operation of the blast furnace so as to lower the melting point of the metal.

In one embodiment of the blast furnace, the $CO_2$ converter is adapted to reduce $CO_2$ to CO by addition of C at a temperature between 800 and 1700° C. Under these circumstances a region of the Boudouard equilibrium may be reached, where a high proportion of the introduced $CO_2$ is converted into CO. This embodiment is advantageous if already hot carbon (C) is available, e.g. from a hydrocarbon converter.

According to one embodiment of the furnace, the further processing converter is a gas engine, a gas turbine or a fuel cell. By means of these machines, heat or mechanical power may be generated from the combustible CO gas.

According to another embodiment of the furnace, the further processing converter is a bio converter in which a conversion process using microbes or algae is carried out according to one or more of the following net equations: a) $6CO+3H_2O \rightarrow C_2H_5OH+4\ CO_2$; b) $6H_2+2CO_2 \rightarrow C_2H_5OH+3H_2O$; c) $2\ CO+4H_2 \rightarrow C_2H_5OH+H_2O$. In this way, CO and particularly the undesirable $CO_2$ may be converted into ethanol by addition of hydrogen. Also kerosene, diesel, gasoline, methanol or other fuels may be produced by choosing appropriate microbes or algae. In this embodiment the further processing converter is a bio converter, in which a conversion process is carried out by use of microbes or algae so as to produce kerosene, diesel, gasoline, methanol or other fuels.

The blast furnace preferably comprises a hydrocarbon converter operated by means of plasma or thermal energy. The hydrocarbon converter comprises at least one hydrocarbon inlet for a fluid containing hydrocarbons and at least one C outlet for at least a carbon and at least one $H_2$ outlet for hydrogen ($H_2$), wherein at least one of the C outlets for at least carbon is connected to the $CO_2$ converter inlet. E.g. inert gases, such as argon or nitrogen may be used as a plasma gas. On the other hand, hydrogen gas $H_2$, CO or synthesis gas may be used as plasma gas, as these gases are produced during the composition of said hydrocarbons anyway. Thus, hot carbon is produced for a reduction of the $CO_2$ contained in the furnace gas or in the exhaust gas mixture of the combustion machine in a Boudouard equilibrium.

Advantageously, one of the $H_2$ outlets for hydrogen ($H_2$) of the hydrocarbon converter is connected to the further processing converter. In this way, considerable amounts of hydrogen are provided, thus facilitating that the biological conversion produces a large amount of ethanol and little or no $CO_2$.

In one embodiment of the blast furnace, the further processing converter is a CO converter, which is adapted to produce functionalised and/or non-functionalised hydrocarbons from a synthesis gas. These hydrocarbons are preferably paraffin, kerosene, diesel, gasoline, liquid gases or methanol. In this way, a sellable product may be produced from the great amounts of generated CO gas. In this embodiment, the synthesis gas is preferably a mixture of hydrogen produced in the hydrocarbon converter and CO produced in the $CO_2$ converter.

The produced mass flows of furnace gas, exhaust gas, C, CO gas, $H_2$ gas, $CO_2$ gas may be ideally converted if the blast furnace comprises a plurality of further processing converters, which may be simultaneously operated.

In an alternative form of the blast furnace, the $CO_2$ converter is adapted to carry out the reduction of $CO_2$ into CO by means of a Reverse-Water-Shift reaction according to the equation $CO_2+H_2 \rightarrow CO+H_2O$. The Reverse-Water-Shift reaction produces a $CO/H_2O$ mixture. In this embodiment the $CO_2$ emissions may be reduced, and no excess streams of CO gas are produced. In this embodiment of the blast furnace, a device for separating water from the $CO/H_2O$ mixture is located in flow direction of the $CO/H_2O$ mixture downstream of the CO outlet of the $CO_2$ converter. In this embodiment the blast furnace further comprises a hydrocarbon converter operated by means of a plasma or by means of thermal energy, wherein the hydrocarbon converter comprises at least one hydrocarbon inlet for a fluid containing hydrocarbons as well as one C outlet for at least carbon and at least one $H_2$ outlet for hydrogen ($H_2$). At least one of the $H_2$ outlets for hydrogen ($H_2$) is connected to the $CO_2$ converter inlet. Thus, great amounts of hydrogen may be provided for reducing the $CO_2$ from the blast furnace shaft.

Preferably, the blast furnace comprises an auxilliary heater, which is adapted to heat a reduction zone and/or melting zone of the blast furnace shaft. By means of additional heating, high temperatures may be achieved in every situation, as high temperatures are necessary for reducing the melting ore and for melting the metal.

The auxiliary heater preferably uses heat energy, which is produced a) in one of the above mentioned combustion machines and/or b) in a further processing converter, which is a combustion machine or a CO converter and/or c) heat energy produced in a hydrocarbon converter operated by means of plasma or thermal energy, as was mentioned above.

The advantages of the blast furnace and the method for processing metal ore are at least the following. Comparatively less or no coal or coke is used. Therefore, significantly less or no ash is produced, and accordingly less or no additives are necessary. In this way expenses for transport and raw materials may be reduced, and the pig iron has better quality. Furthermore, less or no slag is produced. It is not necessary that slag swims on the molten pig metal because there is a reducing protective atmosphere inside the blast furnace shaft.

A basic idea of the presently disclosed blast furnace and methods for processing metal ore is to reduce the carbon dioxide from the furnace gas to carbon monoxide. The reduction gas used in the metallurgical process comes entirely from the blast furnace shaft itself and is not separately produced, such as e.g. in EP 09318401 A1. Another basic idea is that the carbon dioxide from the furnace gas may be used as a synthesis product or synthesis raw material for producing a synthetic sellable product particularly for producing hydrocarbons, as will be described in detail below.

DRAWINGS

The invention and further details and advantages thereof will be discussed in the following with reference to the proof read embodiments and with reference to the attached figures.

DETAILED DESCRIPTION

In the following specification, the terms top, bottom, right and left as well as similar terms relate to the orientations and arrangements, respectively, shown in the figures and are only meant for describing the embodiments. These terms may refer to preferred arrangements but are not meant to be limiting.

Figure 1:
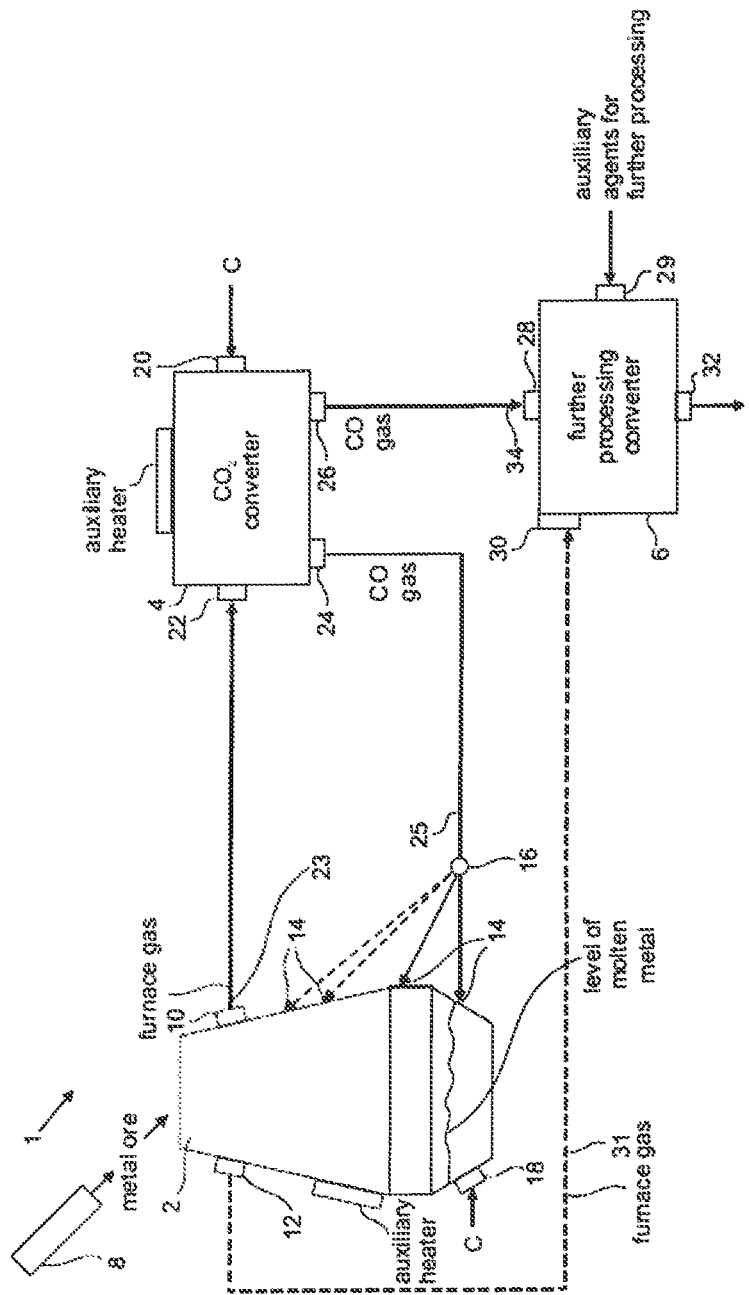
FIG. 1 is a schematic illustration of a blast furnace according to a first embodiment.

FIG. 1 shows a schematic illustration of a blast furnace 1 comprising a blast furnace shaft 2, a $CO_2$ converter 4 and a further processing converter 6. A feeder 8 is located at the upper end of the blast furnace shaft 2, wherein the feeder is adapted to feed raw material or feed stock into the blast furnace shaft 2. Specifically, the raw material is metal ore, possibly necessary additives, reduction material and combustible material for heating or initially heating the blast furnace.

Seen from top to bottom, the blast furnace shaft 2 comprises an inlet zone for drying and preheating, a reduction zone, a carbonisation zone and a melting zone. In the drying and preheating zone the raw material is dried and preheated. In the reduction zone, the metal ore, primarily consisting of metal oxide, will be reduced by CO and C. In the carbonisation zone, a metal carbon mixture is formed wherein the melting point of the metal carbon mixture is between 1000 and 1300° C., depending on the metal. In the melting zone, the metal carbon mixture, particularly an iron carbon mixture, is molten by the heat from burning heating material (e.g. coke, combustible gases, furnace gas etc.) or by means of an auxiliary heater. The raw metal is collected at the bottom of the blast furnace shaft 2. During metal production of the metal ore, a gas mixture is formed in the blast furnace shaft 2. This gas mixture is referred to as furnace gas or flue gas. Due to the heat of the furnace gas of around 150 to 250° C., the furnace gas rises to the top of the blast furnace shaft 2.

In a prior art blast furnace process, the furnace gas has a varying composition consisting of nitrogen ($N_2$, ca. 52-59%), carbon dioxide ($CO_2$, ca. 22-24%), carbon monoxide (CO, ca.18-21%) and hydrogen ($H_2$, ca. 1-3%) and water steam and possibly traces of methane ($CH_4$). The nitrogen and a portion of the oxygen result from air blown into the furnace shaft. Carbon dioxide, carbon monoxide and hydrogen are generated by chemical reactions during operation of the blast furnace, wherein these chemical reactions are well known to the skilled person and are not described in detail.

In the blast furnace process of the present disclosure, it is considered to blow a greater amount of air into the blast furnace shaft during a preheating phase. As soon as a stable operation of the blast furnace 1 is achieved, no considerable amount of air will be blown into the blast furnace shaft 2. Since no air enters the blast furnace shaft 2 from outside, there is accordingly no nitrogen and no oxygen inside the blast furnace shaft 2 during a stable operation. Accordingly, the furnace gas of the present disclosure contains basically no nitrogen during a stable operation. Rather, the furnace gas has a variable composition of carbon dioxide ($CO_2$, ca. 50-53%), carbon monoxide (CO, ca. 42-46%) and hydrogen ($H_2$, ca. 2-6%) as well as water steam ($H_2O$; depending on the residual humidity of the metal ore and the additives) and possibly traces of Methane ($CH_4$). The gases $CO_2$ and CO are formed during chemical conversion of the ore. $CO_2$ and CO may also be formed from the additives. In a practical embodiment the ratio of CO to $CO_2$ in the furnace gas is variable and dependson the construction of blast furnace, on the composition of the iron ore ($Fo_2O_3$ and/or $Fe_3O_4$), on the process parameters etc.

It should be noted that also in the blast furnace process of the present disclosure, comparably small amounts of air, and therefore also some oxygen and nitrogen, may enter into the blast furnace shaft 2. These small amounts of air may enter through leaks in the blast furnace shaft 2 or leaks in pipes or conduits or by means of auxiliary processes (e.g. by means of an auxiliary heater etc.). However, these amounts are very low and may be neglected for the blast furnace process of the present disclosure. Nitrogen is an inert gas and does not participate in any of the described chemical reactions. The amount of oxygen, which might result from a possibly minor amount of air entering into the process, may be neglected when compared to the amount of oxygen which is already present in the metal ore (which is metal oxide). Therefore, these minor portions of gases will be neglected for the following description.

Both in the classical blast furnace process and in the blast furnace process of the present disclosure, also dust particles and other pollutions are contained in the furnace gas. These pollutions are filtered out by a dust catcher or filter so as to avoid pollution of other elements of the blast furnace. A dust catcher is well known to the skilled person and will not be described in detail.

Furthermore, it should be noted that the described gases (CO gas, $CO_2$ gas, $H_2$ gas etc.) are, in fact, gas mixtures. In the following description, the gases will be named after their main constituent or their chemical active constituent so as to be better distinguishable. It will be obvious that the gases also may comprise admixtures or pollutions, which do not have an effect on the described process. Furthermore, these gases may also contain chemically inactive components, such as the nitrogen mentioned above. As an example the CO gas according to the present description may consist of 90% carbon monoxide, but also up to 10% of other constituents. Carbon monoxide (CO) is combustible in the presence of oxygen. When a gas mixture having 90% carbon monoxide, 5% nitrogen and 5% $CO_2$ (such a mixture would be termed as CO gas) is burned, nitrogen and $CO_2$ would not be part of the oxidation reaction and would therefore be chemically inactive constituents.

A first furnace gas outlet 10 and an optional second furnace gas outlet 12 are located at the top of the blast furnace shaft 2. Different amounts of furnace gas may be exhausted from the furnace gas outlets 10, 12 during operation. Furthermore, a plurality of CO inlets 14 is provided at different heights of the blast furnace shaft 2. Gaseous carbon monoxide may be blown into the blast furnace shaft 2 at different heights via the CO inlets 14. A divider unit 16 is provided for directing one or more streams of CO to the CO inlets 14 at different heights. The divider unit 16 comprises e.g. valves, shutters and pipes, which are not shown in detail. At least one of the CO inlets 14 is located at a lower region of the blast furnace shaft 2 above the level of the molten metal established during the operation. Particularly, the CO inlets 14 are located in the region of the blast nozzles or tuyeres in a prior art blast furnace shaft. In case an existing blast furnace shall be retrofitted for the process of the present disclosure, the existing tuyeres of the blast furnace shaft may be used as CO inlets 14. Furthermore, at least one of the CO inlets 14 may be optionally provided at a height below the level of the molten metal during the operation of the blast furnace 1.

A C inlet 18 is located at the lower region of the blast furnace shaft 2. During the operation, carbon (C) may be fed into the blast furnace shaft via the C inlet 18 below the level of the molten metal so as to lower the melting point of the metal. Alternatively or additionally, a C inlet 18 may be located in the region of the reduction zone wherein carbon in powder form may be blown in via the C inlet 18 so as to lower the melting point of the metal reduced at this point in time.

The $CO_2$ converter 4 comprises a $CO_2$ converter inlet 20, a $CO_2$ converter gas inlet 22, a first CO outlet 24 and a second CO outlet 26. The $CO_2$ converter gas inlet 22 is directly connected to the first furnace gas outlet 10 of the blast furnace shaft 2 by means of a first furnace gas conduit 23. In the following description, also embodiments having an indirect connection between the $CO_2$ converter gas inlet 22 and the furnace gas outlet 10 will be described with reference to FIG. 2 and FIG. 4.

In the following specification and in the claims, the terms "direct" and "indirect" and similar terms will be used, such as "directly connected". In this context the term "direct" means that a substance or material will be directed from one element of the blast furnace 1 to another element without any processing or converter in between. Accordingly, the term "indirect" means that a substance is routed from one element to another element wherein the substance is processed or converted between said elements.

In the embodiment of FIG. 1, the $CO_2$ converter 4 comprises a first CO outlet 24 and a second CO outlet 26. Alternatively, the $CO_2$ converter could comprise only one CO outlet 24 or 26, wherein a divider (not shown) is located downstream of said CO outlet 24 and/or 26, wherein said divider is able to route any desired portions of the CO flow produced in the $CO_2$ converter to different other converters or elements of the blast furnace 1. Furthermore, it is possible that the $CO_2$ converter 4 comprises a plurality of first CO outlets 24, which lead e.g. to a plurality of CO inlets 14 or to a plurality of divider units 16. Notwithstanding the above, the $CO_2$ converter 4 may comprise a plurality of second CO outlets 26, which lead to a different further processing converter 6.

The $CO_2$ converter 4 may be any suitable $CO_2$ converter which is able to produce carbon monoxide (CO) from carbon (C) and carbon dioxide ($CO_2$). In the embodiment of FIG. 1, the $CO_2$ converter 4 operates according to a part reaction of a known reaction in a blast furnace, wherein said part reaction takes place at temperatures between 750° C. and 1200° C. without the necessity of a catalyst. Preferably, the $CO_2$ converter 4 operates at a temperature between 800° C. and 1200° C. The operating temperature of the $CO_2$ converter 4 may be chosen depending on the temperature of the introduced materials (i.e. furnace gas, exhaust gas mixture containing $CO_2$, carbon). If the introduced substances or materials have a high temperature, then the operating temperature of the $CO_2$ converter 4 may also be high. As was discussed above, in the blast furnace process of the present disclosure, the furnace gas directed into the $CO_2$ converter 4 primarily consists of carbon monoxide (CO) and carbon dioxide ($CO_2$). In the $CO_2$ converter 4, the CO is directed over hot carbon or is mixed with hot carbon (and possibly with hydrogen) so as to be converted according to the following chemical reaction:

$$CO_2 + C \rightleftharpoons 2CO$$

The carbon C introduced into the $CO_2$ converter 4 may simply be delivered from a storage container. In the following description with respect to FIG. 4, an embodiment will be discussed wherein hot carbon C is produced in a hydrocarbon converter and is directed into the $CO_2$ converter. The $CO_2$ converter 4 operates best at the Boudouard-Equilibrium. At temperatures around 800° C., about 94% carbon monoxide will be provided, and at temperatures of around 1000° C., about 99% carbon monoxide will be provided. Furthermore, residual water, which may be present as residual humidity in the metal ore or in the additives, may be present in the form of water steam ($H_2O$) and will be converted in the $CO_2$ converter according to the following reaction:

$$C + H_2O \rightleftharpoons CO + H_2$$

The other components of the furnace gas (CO and possibly traces of $N_2$, $H_2$ and $CH_4$), which are also directed into the $CO_2$ converter, are not part of a chemical conversion.

The gas mixture discharged from the $CO_2$ converter 4 is actually a synthesis gas having a low hydrogen content, wherein said synthesis gas is directed into the further processing converter. The hydrogen content depends on the humidity of the metal ore or on the additives and on the amount of hydrogen which is possibly mixed with the carbon. The gas mixture primarily consists of CO gas, wherein a portion of the CO was already present as a constituent of the furnace gas, and wherein the rest of the CO results from the conversion of $CO_2$ contained in the furnace gas inside the $CO_2$ converter 4.

The further processing converter 6 is a device, which is able to process CO and $CO_2$ alone or in connection with other raw materials in a further processing process. The further processing converter 6 comprises a CO inlet 28, an auxilliary agent inlet 29, an optional furnace gas inlet 30 and a further processing converter outlet 32. The $CO_2$ inlet is connected to the CO outlet 28 of the $CO_2$ converter by means of a CO connection 34. The optional furnace gas inlet 30 of the further processing converter 6 is connected to the second furnace gas outlet 12 of the blast furnace shaft 2 via a second furnace gas connection 31. In the embodiment of FIG. 1, the further processing converter 6 maybe a combustion machine, a bio converter or a CO converter, which is able to produce a synthetic functionalised and/or non-functionalised hydrocarbons, as will be explained in the following:

A combustion machine, which may be employed as one form of the further processing converter 6, may be e.g. a gas burner, a gas turbine or a gas engine. In the combustion machine, CO will be burned in the presence of oxygen or air so as to produce energy for another machine and/or for generating heat. Furthermore, the further processing converter may be a fuel cell, in which CO is oxidised with added oxygen.

In a bio converter, which may be an alternative form of the further processing converter 6, a conversion process using microbes or algae is carried out according to one or more of the following net equations:

$$6CO + 3H_2O \rightarrow C_2H_5OH + 4CO_2; \quad\quad a)$$

$$6H_2 + 2CO_2 \rightarrow C_2H_5OH + 3H_2O; \quad\quad b)$$

$$2CO + 4H_2 \rightarrow C_2H_5OH + H_2O. \quad\quad c)$$

In the case of a bio converter, naturally occurring or genetically modified microbes or algae are used for converting gases containing carbon monoxide (the furnace gas) or pure carbon monoxide (CO coming from the $CO_2$ converter 4) or carbon dioxide, which may be optionally mixed with hydrogen (as will be described below) into basic chemicals. Such basic chemicals are e.g. alcohol, ether or ester. In this conversion the capability of these microbes or algae is used, i.e. the capability to produce themselves the hydrogen necessary for the reduction of Carbon dioxide in a sort of internal Water-Shift reaction (WSR). The conversion of $CO_2$ into ethanol ($C_2H_5OH$ or also $C_2H_6O$) may be summarised as follows:

$$6CO + 3H_2O \rightarrow C_2H_5OH + 4CO_2$$

If also hydrogen is added, the following net reaction results:

$$6H_2 + 2CO_2 \rightarrow C_2H_5OH + 3H_2O$$

Also kerosene, diesel, gasoline, methanol or other fuels may be produced, if the appropriate microbe or algae are chosen. Appropriate microbes or algae are known, e.g. anaerobe bacteria called Clostridium, which are commercially available from the following companies: Coskata, USA, and BRI, USA, as well as Lanza Tech, New Zealand. In the bio converter, the microbes or algae are brought into contact with the introduced gases. It is also considered to feed accessory agents or auxiliary agents into the bio converter, depending on the type of microbes or algae, wherein theses accessory agents may serve for supporting the vital functions of the microbes or algae. Construction and operation of a bio converter, which is also known as a synthesis gas fermentation converter, are known to the skilled person from the technical literature.

A third option for implementing the further processing converter 6 is a CO converter, in which a synthesis gas is converted into a functionalised and/or non functionalised hydrocarbon, preferably into paraffin, kerosene, diesel, gasoline, liquid gases or methanol. In this case, the further processing converter 6 is e.g. Fischer-Tropsch converter, a Bergius-Pier converter or a Pier converter. The construction and operation of such converters is known to the skilled person and will not be described in detail. In case the further processing converter 6 is a CO converter, hydrogen will be introduced via the accessory agent inlet 29. This case will be described in more detail with respect to FIG. 4.

Feeding the furnace gas from the blast furnace shaft 2 into the further processing converter 6 via the second furnace gas connector 31 is optional and is advantageous if the processing converter 6 is a bio converter or a combustion machine.

Auxilliary agents will be introduced into the further processing converter 6 via the auxilliary agent inlet 29, wherein the auxilliary agents are necessary for further processing the CO or $CO_2$ in the further processing converter. These auxilliary agents are e.g. hydrogen (in case the further processing converter 6 is a bio converter or CO converter), air or pure oxygen, respectively (in case the further processing converter 6 is a combustion machine), or other auxilliary agents.

The further processing converter outlet 32 outputs the products produced by the further processing converter 6. This means in the case of a gas engine or a gas turbine, the further processing converter outlet 32 is a motor shaft or a turbine shaft. In the case of a chemical further processing converter (bio converter or CO converter), the further processing converter outlet is an outlet for liquid or gaseous products produced in the further processing converter 6.

Figure 2:
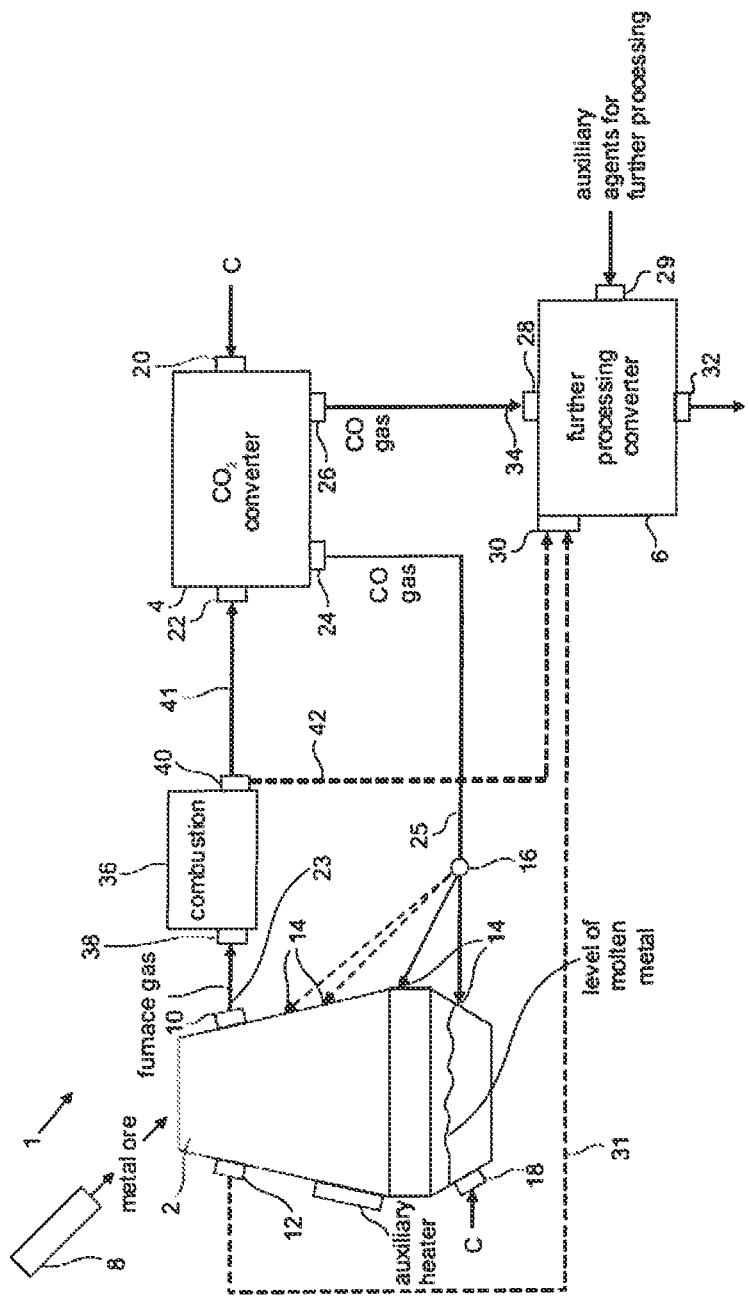
FIG. 2 is a schematic illustration of a blast furnace according to a second embodiment.

FIG. 2 shows another embodiment of the blast furnace 1, which is constructed in a similar way to the embodiment of FIG. 1. The same or corresponding elements of the blast furnace 1, that were already discussed with respect to FIG. 1, will have the same reference signs in FIG. 2 and will not be discussed in detail for brevity.

The blast furnace 1 shown in FIG. 2 additionally comprises a combustion machine 36 (i.e. additionally with respect to the blast furnace 1 of FIG. 1), wherein the combustion machine is located between the blast furnace shaft 2 and the $CO_2$ converter 4. The combustion machine 36 comprises a combustion gas inlet 38 and an exhaust gas outlet 40 for emitting an exhaust gas containing $CO_2$. The furnace gas outlet 10 of the blast furnace shaft 2 is connected to the combustion gas inlet 38. The exhaust gas outlet 40 is connected to the $CO_2$ converter gas inlet 22 of the $CO_2$ converter 4. This means that the first furnace gas outlet 10 is indirectly connected to the $CO_2$ converter gas inlet 22, since a combustion step takes place in the combustion machine 36 between the blast furnace shaft 2 and the $CO_2$ converter 4.

The combustion machine 36 may be a gas engine, a gas turbine or a gas burner, which produce exhaust gases containing $CO_2$. If the combustion machine 36 is a gas burner, the heat produced by the gas burner may be used for heating the blast furnace shaft 2 by means of an auxiliary heater or for preheating gases or other raw material which shall be fed into the blast furnace shaft 2 or into the $CO_2$ converter 4. If the combustion machine 36 is a gas engine or a gas turbine, the output of the gas engine or gas turbine may be used for powering pumps or fans, which may be necessary for the operation of the blast furnace 1.

As shown in FIG. 2, all of the exhaust gas containing $CO_2$ may be directed from the exhaust outlet 40 into the $CO_2$ converter 4 via a first exhaust connection 41 (as shown in solid line). Optionally (as shown in dashed line), a portion of the exhaust may be directed from the exhaust outlet 40 into the further processing converter 6 via a second exhaust connection. The exhaust may be directed in the further processing converter 6 via the furnace gas inlet 30.

Figure 3:
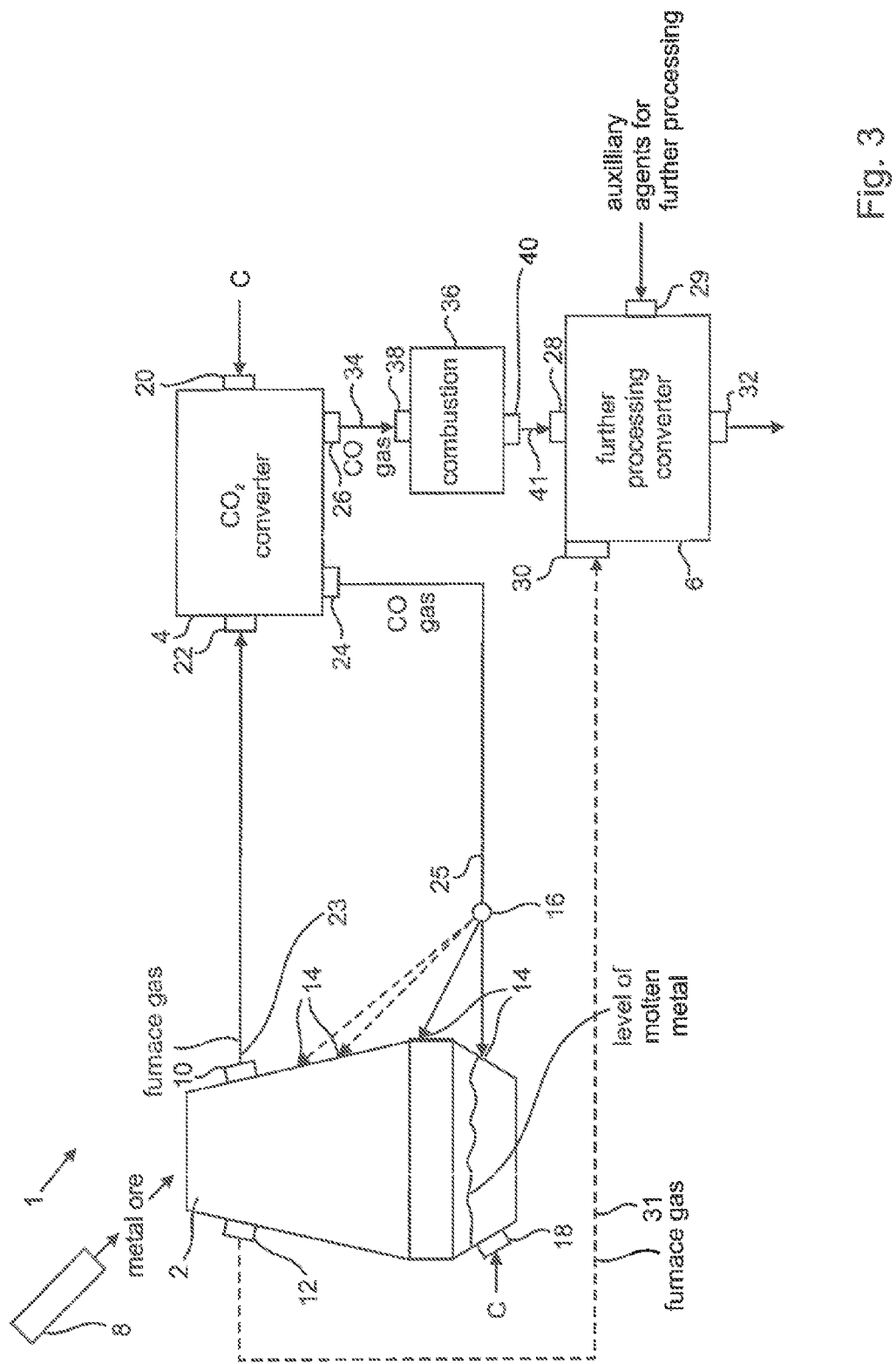
FIG. 3 is a schematic illustration of a blast furnace according to a third embodiment.

FIG. 3 shows another embodiment of the blast furnace 1, which has a construction similar to the embodiments of FIGS. 1 and 2. The same or corresponding elements of the blast furnace 1, which were already discussed with respect to FIG. 1 or 2, have the same reference signs and will not be discussed in detail for brevity.

The blast furnace 1 shown in FIG. 3 additionally comprises a combustion machine 36 (i.e. additionally with respect to the blast furnace 1 of FIG. 1), wherein the combustion machine is located between the $CO_2$ converter 4 and the further processing converter 6. The combustion machine 36 comprises a combustion gas inlet 38 and exhaust outlet 44 for exhausting an exhaust gas containing $CO_2$. The second CO outlet 36 of the $CO_2$ converter 4 is connected to the combustion gas inlet 38. The exhaust gas outlet 40 is connected to the CO inlet 28 of the further processing converter 6. This means that the second CO outlet 26 of the $CO_2$ converter 4 is indirectly connected to the CO inlet 28 since a combustion step takes place in the combustion machine 38 between the $CO_2$ converter 4 and the further processing converter 6.

The combustion machine 36 may be a gas engine, a gas turbine or a gas burner, which produce an exhaust gas containing $CO_2$. If the combustion machine 36 is a gas burner the heat produced by the gas burner may be used for heating the blast furnace shaft 2 by means of an auxiliary heater or for preheating gases or other materials which are directed into the blast furnace shaft 2 or into the $CO_2$ converter 4. If the combustion machine 36 is a gas engine or a gas turbine, the output of the gas engine or gas turbine may be used for powering e.g. pumps or fans, which are necessary for operating the blast furnace 1.

Figure 4:
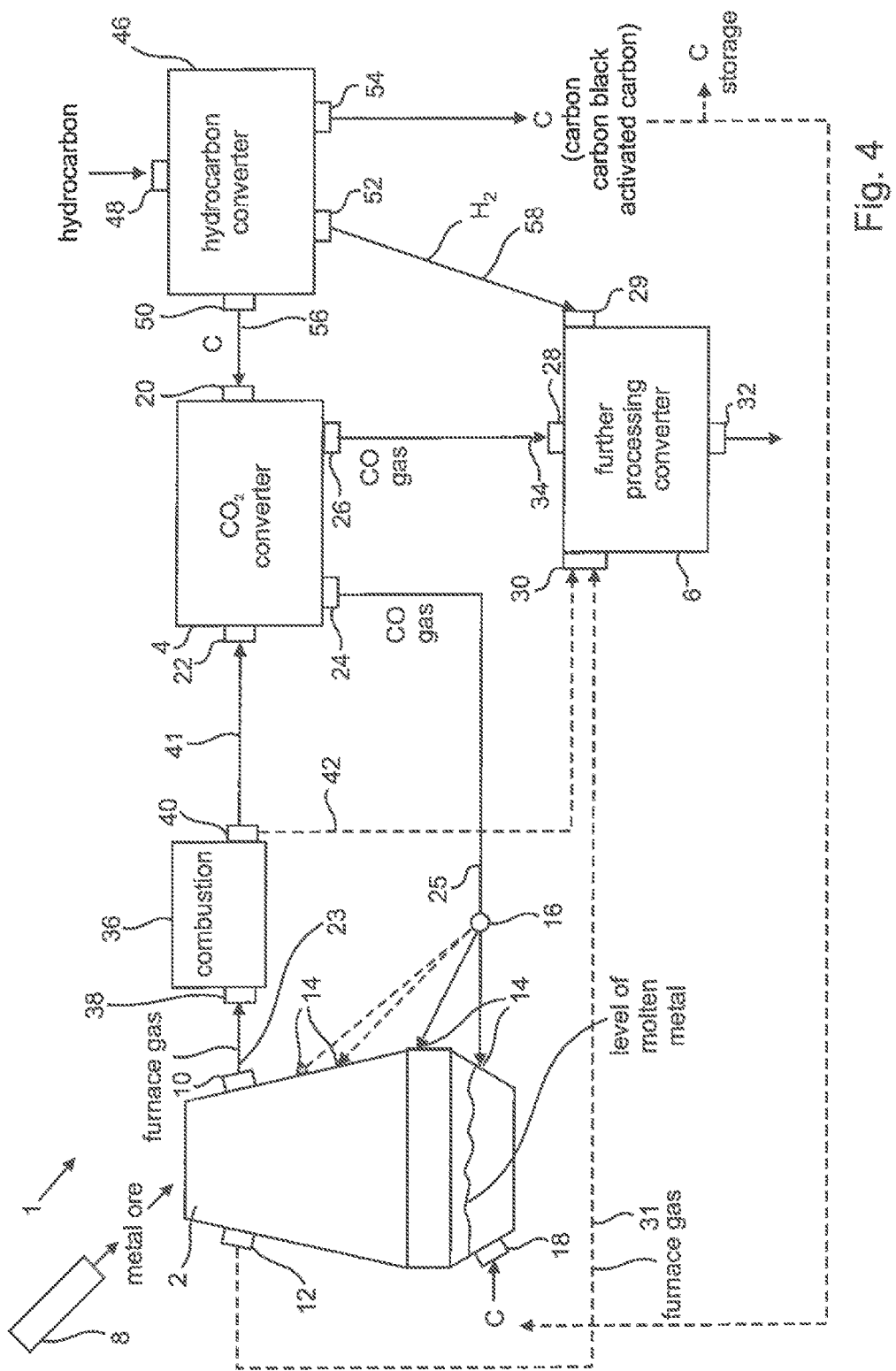
FIG. 4 is a schematic illustration of a blast furnace according to a fourth embodiment.

FIG. 4 shows another embodiment of the blast furnace 1 which has a construction similar to the embodiments of FIGS. 1, 2 and 3. The same and similar elements of the blast furnace 1, which were already discussed with respect to FIGS. 1 to 3, have the same reference signs in FIG. 4 and will not be discussed in detail for brevity.

The blast furnace 1 shown in FIG. 4 comprises a combustion machine 36 which is located between the blast furnace shaft 2 and the $CO_2$ converter 4. The combustion machine 36 was already described in detail with reference to FIG. 2. The exhaust gases containing $CO_2$ from the exhaust gas outlet 40 are introduced in the same way as described above with respect to FIG. 2.

The blast furnace of FIG. 4 further comprises a hydrocarbon converter 46. The hydrocarbon converter 46 comprises at least one hydrocarbon inlet 48 for introducing a fluid containing hydrocarbons, and a first C outlet 50 for emitting at least carbon (optionally mixed with some hydrogen) and a $H_2$ outlet 52 for emitting hydrogen. The hydrocarbon converter 46 is any hydrocarbon converter which is able to convert or decompose hydrocarbons ($C_nH_m$) into carbon and hydrogen, particularly a hydrocarbon converter operated by means of a plasma or by means of thermal energy. The hydrocarbon converter 46 may optionally comprise a second C outlet 54 for discharging carbon. The first C outlet 50 is connected to the $CO_2$ converter inlet 20 of the $CO_2$ converter 4 via a C connection 56. The $H_2$ outlet 52 is connected to the auxiliary agent inlet 29 of the further processing converter 6 via a $H_2$ connection 58 and thus supplies $H_2$ as an auxiliary agent. The first C outlet 50 and the $H_2$ outlet 52 may also be integrated into a combined outlet 50/52 for carbon and hydrogen. The combined outlet 50/52 is not shown in the Figs. but may be present in all of the described embodiments. Carbon and hydrogen may be routed concurrently from the combined outlet 50/52 into the $CO_2$ converter 4. Particularly carbon and hydrogen may be provided in form an $H_2$/C aerosol.

The hydrocarbon converter 46 is preferably a plasma operated reactor, particularly a Kvaerner reactor. In the hydrocarbon converter, the hydrocarbons, in form of fluids containing hydrocarbon, are decomposed at high temperatures by means of a plasma unit or a plasma burner into pure carbon (for instance in Form of activated coal, carbon black, graphite or industrial soot) and hydrogen. The hydrocarbon containing fluids used as starting material or raw material for the hydrocarbon converter 46 may be e.g. methane, natural gas, biogases, wet gases or liquid gases or heavy oil. However, synthetic functionalized and/or non functionalized hydrocarbons may also be used as starting material for the hydrocarbon converter 46. In an alternative embodiment, the hydrocarbon converter 46 is operated with thermal energy and is able to decompose the hydrocarbons e.g. by means of pyrolysis. Decomposing the hydrocarbons should be done, if possible, in the absence of oxygen in order to suppress the formation of carbon oxides or water, which is not desirable. Nevertheless, small amounts of oxygen, which might be introduced together with the hydrocarbons, are not detrimental for the process.

The hydrocarbon converter comprises a process chamber having an inlet for a fluid containing hydrocarbons, at least one unit for introducing decomposing energy into the fluid and at least one outlet. The decomposing energy is provided at least partially by beat, which is for instance provided by plasma (plasma reactor). Nevertheless, the decomposing energy may be also provided by other means (thermal reactor). Primarily, the composition is carried out by heat. The fluid should be heated to a temperature above 1000° C. particularly above 1500° C. In a plasma operated hydrocarbon converter, the plasma gas may be any suitable gas which is introduced from outside or is formed inside the hydrocarbon converter. Inert gases, such as argon or nitrogen may be used as a plasma gas. Alternatively, gaseous hydrogen $H_2$, CO or synthesis gas would be an option, as these gases are produced anyway during the composition of the hydrocarbons.

The hydrocarbon converter 46 may be a high temperature reactor which works at a temperature of more than 1000° C. (e.g. a high temperature Kvaerner reactor). Alternatively, the hydrocarbon converter may be a low temperature reactor which works at a temperature between 200° C. and 1000° C. (e.g. a low temperature Kvaerner reactor).

In another embodiment, the hydrocarbon converter 46 may be a combination of one or more high temperature reactors and one or more low temperature reactors. Such an arrangement will be described below with reference to FIG. 6.

The carbon produced in the hydrocarbon converter 46 may be discharged from the first C outlet 50 and the second C outlet 54 in varying proportions. The first C outlet 50 is used to direct a portion of the produced carbon (C) into the $CO_2$ converter 4. Together with the carbon, a variable portion of the hydrogen resulting from the decomposition step may be directed from the C outlet 50 into the $CO_2$ converter 4. (In this case, the C outlet 50 and the $H_2$ outlet 52 form a combined outlet 50/52). The hydrogen is not detrimental for the above referenced reaction of C and $CO_2$ in the $CO_2$ converter 4. The hydrogen may also function as an energy carrier, since the hydrogen is very hot as a result of the decomposition step in the hydrocarbon converter 46.

The second C outlet 54 is used to extract a portion of the produced carbon which is not used in the $CO_2$ converter 4 for generating carbon monoxide. The produced carbon has different temperatures depending on the construction of the hydrocarbon converter 46. The temperatures are between 200° C. and 1000° C. if a thermally operated reactor or a low temperature plasma reactor is used, however, the temperatures may be up to 1700° C. in case a high temperature plasma reactor is used.

As was mentioned above, the operating temperature of the $CO_2$ converter 4 may be chosen depending on the temperature of the introduced raw materials (i.e. furnace gas, exhaust gas containing C02, carbon). If the carbon (and optionally the concurrently introduced hydrogen) directed into the $CO_2$ converter 4 has a high temperature of e.g. 1500° C. to 1700° C., the operating temperature of the $CO_2$ converter 4 may be also high. If a hydrocarbon converter 46 is used which produces a carbon having a temperature of only 200° C. to 700° C., the present disclosure considers to additionally heat the $CO_2$ converter 4 so as to achieve a better $CO_2$ conversion of the furnace gas/exhaust gas. It should be noted that the temperature of the carbon depends on the operating temperature of the hydrocarbon converter 46, on the construction of the C connection isolation etc.

The carbon discharged from the second C outlet 54 may be taken from the process as a product, such as activated coal, graphite, carbon black or other modifications such as carbon cones or carbon discs. Depending on the form and quality of the discharged carbon, the discharged carbon may be used as a raw material in the chemical industry or for the electronic industry. Conceivable applications are e.g. semiconductor production, tire production, inks, toners or similar products. The carbon produced in the hydrocarbon converter 46 is a high purity raw material which may be easily further processed, particularly if a plasma operated hydrocarbon converter is used.

The optional second C outlet 54 of the hydrocarbon converter 46 may also be connected to the C inlet 18 of the blast furnace shaft 2. Thus, the carbon produced in the hydrocarbon converter 46 may be used in the blast furnace process.

In the embodiment of FIG. 4, an additional combustion machine 36, as was described above with respect to the embodiment of FIG. 3, may be optionally provided between the $CO_2$ converter 4 and the further processing converter 6. This second combustion machine 36 is not shown in FIG. 4 for brevity. Providing a second combustion machine 36 between the $CO_2$ converter 4 and the further processing converter 6 depends on the type of the further processing process in the further processing converter 6.

As mentioned above, the gas mixture coming from the $CO_2$ converter 4 is actually a synthesis gas having a low hydrogen content, wherein the synthesis gas primarily consists of CO. This synthesis gas may be mixed with hydrogen coming from the hydrocarbon converter 46 so as to produce a synthesis gas having high hydrogen content. Mixing CO and hydrogen may be directly carried out in the further processing converter 6 or in a mixer (not shown) provided upstream of the further processing converter. In an embodiment where carbon and at least a portion of the hydrogen from the hydrocarbon converter 46 are concurrently directed into the $CO_2$ converter 4 (e.g. in form of an $H_2$/C-aerosol), the $CO_2$ converter 4 produces a synthesis gas having a higher hydrogen content.

The further processing converter 6 of the embodiment shown in FIG. 4 may also be operated with a gas mixture comprising different proportions of $CO_2$, CO and $H_2$. The $CO_2$ proportion of the gas mixture directed into the further processing converter 6 comes from the exhaust gas of the combustion machine 36. The $CO_2$ proportion of the gas mixture is higher or lower depending on whether the combustion machines 36 are provided at all and depending on which amounts of furnace gas or CO are burnt therein. The CO proportion of the gas mixture comes from the $CO_2$ converter, and the $H_2$ proportion comes from the hydrocarbon converter 46. The gas mixture may be called a synthesis gas. Synthesis gas, abbreviated syngas, is a gas mixture of carbon monoxide and hydrogen which may also comprise carbon dioxide. Synthesis gas has about 50% of the energy content of natural gas. Synthesis gas may be burnt and may thus serve as a fuel source. Synthesis gas may also be used as an intermediate product for producing other chemical products.

The gas mixture provided into the further processing converter 6 is combustible and may generally be burnt so as to produce mechanical power or heating power. In this case, the further processing converter 6 is a combustion machine. The mechanical power produced therein may be used e.g. for producing electrical power or for powering other machines in the blast furnace 1. Combustion heat may be used e.g. for heating the blast furnace shaft 2.

The further processing converter 6 may also be a bio converter, as was described above with respect to the embodiments of FIGS. 1 to 3. If the further processing converter 6 is a bio converter, it may be desired to direct varying proportions of CO and $CO_2$ into the further processing converter 6, depending on the type of the microbes or algae used therein. A portion of the CO stream from the second CO outlet 26 may be directly directed into the further processing converter 6, while another portion of the CO stream coming from the second CO outlet 26 may be routed through a combustion machine 36 and may be burnt therein so as to produce heat and to provide more $CO_2$ into the further processing converter 6. Thus, a mixture of CO and $CO_2$ may be delivered which is advantageous for the further processing converter 6. In the bio converter, the gas mixture is converted according to one of the above mentioned equations using algae or microbes depending on the $CO_2$, CO and $H_2$ proportion of the gas mixture.

If the further processing converter 6 is a CO converter for producing functionalized and/or non-functionalized hydrocarbons, the gas mixture provided into the further processing converter 6 is a synthesis gas which mainly consists of CO and $H_2$. From said synthesis gas, the CO converter preferably produces paraffin, kerosene, diesel, gasoline, wet gases or liquid gases or methanol by means of the above referenced processes (Fischer-Tropsch process, Bergius-Pier process etc.). In this case, the gas mixture contains few or not exhaust gas containing $CO_2$, since preferably CO and $H_2$ are directed into the further processing converter 6.

For all embodiments discussed above, it should be noted that the furnace gas, which is directed from the optional second furnace gas outlet 12 and through the optional second furnace gas connection 31, may be purified from detrimental materials such as sulfur, ash, heavy metals and other substances which might be detrimental for a corresponding further processing converter 6. If the further processing converter 6 is just a combustion machine, also non-purified furnace gas from the second furnace gas outlet 12 may be used.

For all embodiments discussed above, it should further be noted that a portion of the exhaust gas containing $CO_2$ may be routed from one of the combustion machines 36 directly into the further processing converter 6, if a particular $CO_2$ proportion is desired for the further processing converter 6.

Figure 5:
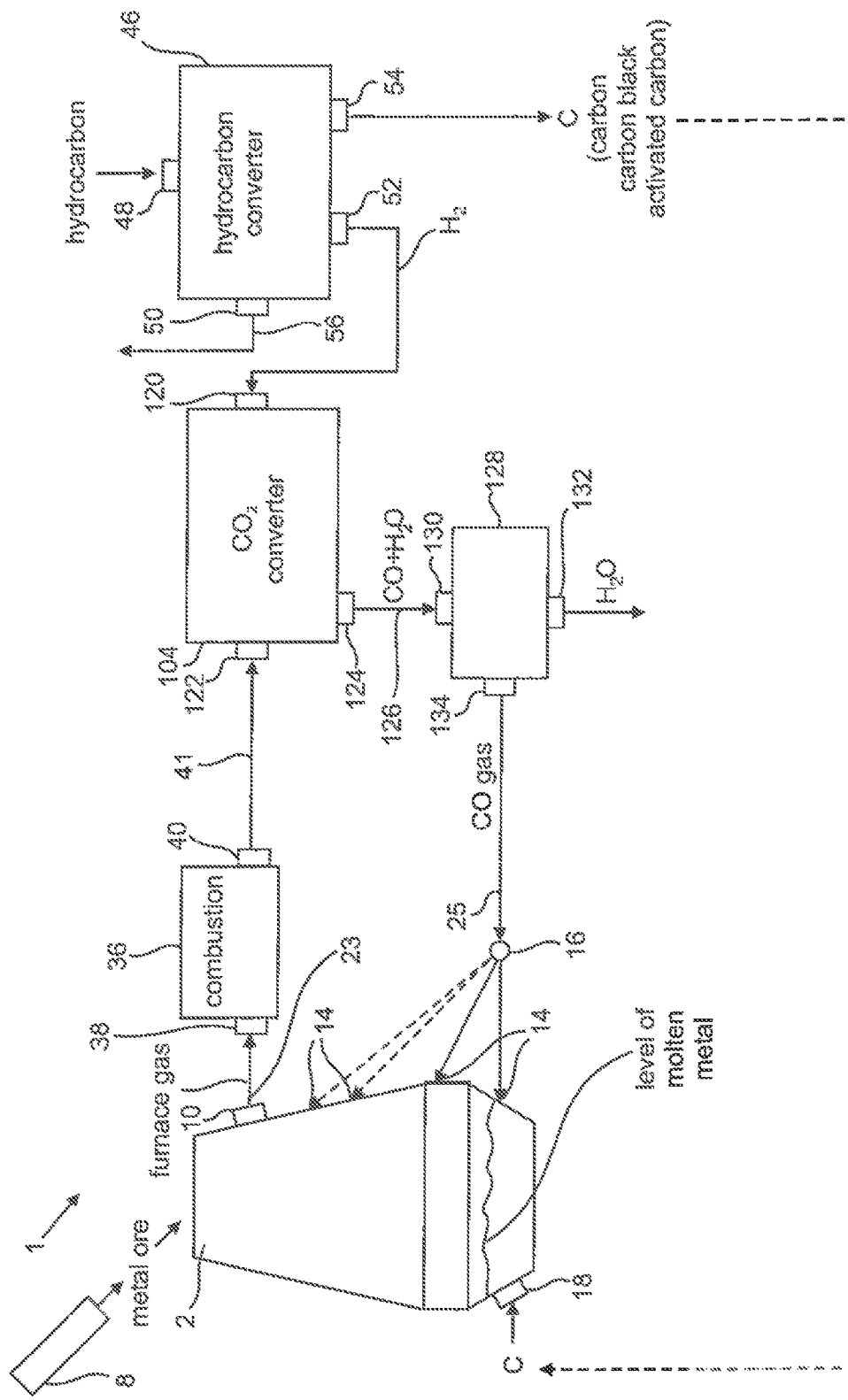
FIG. 5 is a schematic illustration of a blast furnace according to a fifth embodiment.

The embodiment of FIG. 5 shows another blast furnace 1 which processes the furnace gas, particularly the $CO_2$ comprised in the furnace gas, by means of an alternative $CO_2$ converter 104. The same or corresponding elements of the blast furnace 1 which were already discussed with reference to FIGS. 1 to 4 will have the same reference signs in FIG. 5, and these elements will not be discussed in detail for brevity.

The blast furnace shaft 2 is constructed in the same way as in the above described embodiments of FIGS. 1 to 4. A combustion machine 36 may also be located between the blast furnace shaft 2 and the alternative $CO_2$ converter 104, wherein the combustion machine produces exhaust gas containing $CO_2$. The exhaust gas containing $CO_2$ will be routed into the $CO_2$ converter gas inlet 122 of the alternative $CO_2$ converter 104 by means of an exhaust gas connection 41.

The alternative $CO_2$ converter 104 of the embodiment according to FIG. 5 is adapted to convert $CO_2$ into a mixture of CO and $H_2O$ by means of a Reverse-Water-Shift reaction or RWS reaction according to the following equation.

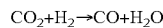
$$CO_2 + H_2 \rightarrow CO + H_2O$$

Therefore, the alternative $CO_2$ converter 104 is referred to as RWS $CO_2$ converter 104 in the following. The RWS $CO_2$ converter 104 comprises a $CO_2$ converter inlet 120, a $CO_2$ converter gas inlet 122 and a $CO_2$ converter outlet 124, wherein the CO/$H_2O$ mixture is discharged from said $CO_2$ converter outlet 124.

The CO/$H_2O$ mixture is routed through at mixture connection 126 into a water separator 128, wherein the water separator 128 comprises a mixture inlet 130, an $H_2O$ outlet 132 and a CO outlet 134. The water separator 128 is adapted to separate $H_2O$ from the CO/$H_2O$ mixture and to discharge said $H_2O$ via the $H_2O$ outlet 132. The separated CO gas may be discharged from the CO outlet 134 and may be routed to the distributor unit 16. The distributor unit 16 directs the CO gas to different heights of the blast furnace shaft 2. It should be noted that the water separator 128 is optional and that also an amount of water may be introduced into the blast furnace shaft 2 depending on the desired control method of the metallurgical process.

The blast furnace 1 of the fifth embodiment also comprises a hydrocarbon converter 46 which may be constructed in the same way and may work according to the same methods as discussed above with reference to the embodiments of FIGS. 1 to 4. However, the hydrocarbon converter 46 of the fifth embodiment is connected differently. The $H_2$ outlet 52 of the hydrocarbon converter 46 is connected to the $CO_2$ converter inlet 120 of the RWS $CO_2$ converter 104. As mentioned above, a portion of the carbon (C) produced inside the hydrocarbon converter 46 may be sold as a product, e.g. discharged from the first C outlet 50. Alternatively, the carbon (C) may be directed into the blast furnace shaft 2 via the C inlet 18. As described for the other embodiments, the hydrocarbon converter 46 may have only one C outlet 50, 54, and the desired C proportion may be discharged later. The C outlets 50 and 54 are only provided for describing that different C flows would be possible.

Any excess hydrogen $H_2$ coming from the hydrocarbon converter 46 which is not used or converted in the RWS $CO_2$ converter 104 may optionally be directed to a $H_2$ storage container. The stored hydrogen may be sold as a product or may be used for heating other places in the disclosed process.

In all embodiments of FIGS. 1 to 5, an auxiliary heater (not shown in the figures) may be provided, wherein the auxiliary heater is adapted to heat the reduction zone of the blast furnace shaft 2. Such additional heating may be necessary since lower process temperatures may be expected compared to a previously known blast furnace process wherein coke or coal and iron ore are fed into the blast furnace shaft 2 together with additives. Accordingly, it might be necessary to provide additional or auxiliary heating depending on the construction and size of the blast furnace shaft 2 and depending on the temperature of the raw materials fed into the blast furnace shaft 2. Said auxiliary heater may use heat which is produced in one of the combustion machines 36 or in the further processing converter 6 if the further processing converter 6 is a combustion machine. Furthermore, the auxiliary heater may use waste heat from the hydrocarbon converter 46. As already mentioned, the hydrocarbon converter 46 produces a considerable amount of waste heat during decomposition of the hydrocarbons, irrespective of the hydrocarbon converter 46 being operated thermally or by means of a plasma.

It should also be noted that, depending on the size of the various converters and the blast furnace shaft 2, more than one $CO_2$ converter, more than one hydrocarbon converter, more than one combustion machine and more than one further processing converter may be provided and may be operated in parallel in all embodiments of FIGS. 1 to 5.

Furthermore, a plurality of further processing converters 6 is considered for all embodiments of FIGS. 1 to 5, wherein these further processing converters 6 work according to different principles. As an example, a first further processing converter 6 may be implemented as a gas burner (first combustion machine) for additionally heating the blast furnace shaft, a second further processing converter 6, operating in parallel to the first further processing converter, may be implemented as a gas turbine (second combustion machine), wherein said gas turbine produces power for pumps or fans of the blast furnace 1, a third further processing converter 6, which is also operated in parallel, may be operated with a synthesis gas comprising CO and $H_2$ so as to produce hydrocarbons in the above described way (CO converter according to Fischer-Tropsch principle), and the rest of the gas mixture may be converted in a biological process using alga or microbes in a fourth further processing converter 6 (bio converter).

Based on the discussion above, the following advantageous combinations may be summarized:

1. A $CO_2$ converter 4 which reduces $CO_2$ to CO in presence of C according to the Bouduoard equilibrium, wherein the $CO_2$ converter 4 is combined with a further processing converter 6 which is one of a combustion machine, a bio converter or a CO converter converting synthesis gas. Particularly preferred further processing converters are a bio converter and a CO converter converting synthesis gas, since few or no $CO_2$ is emitted from the overall process in these embodiments (see examples 1 to 4 below).

2. An alternative RWS $CO_2$ converter 104 which reduces $CO_2$ and $H_2$ to a $CO/H_2O$ mixture according to the Reverse-Water-Shift reaction, wherein the RWS $CO_2$ converter 104 is combined with an optional water separator.

In all embodiments mentioned above, it will be advantageous if the carbon necessary for reducing $CO_2$ or the hydrogen is produced in a hydrocarbon converter which may be operated with readily available and low cost hydrocarbons. Particularly, it is considered to feed naturally occurring gases containing hydrocarbons, i.e. natural gas, fracking gas or other readily available and low cost gases into the hydrocarbon converter 46.

In the following, operation of the embodiments of FIGS. 1 to 5 is described. First, the basic operation shall be explained based on the simple illustration of the first embodiment.

During operation, metal ore, mainly consisting of metal oxides, is fed into the blast furnace shaft via the feeder 8. During operation, there is a temperature distribution in the blast furnace shaft 2 from the top to the bottom ranging from about 200 to 2000° C. In operation, the drying and preheating zone has a temperature of about 200° C., the reduction zone has a temperature of about 400 to 900° C., the carbonisation zone has a temperature of about 1000 to 1500° C., and the melting zone has a temperature of about 1200 to 1800° C.

As mentioned above, the raw materials fed via the feeder 8 are usually metal ore, additives and coke or coal, respectively, as heating and reduction material. By means of the process according to the present disclosure, feeding of coke or coal as a heating and reduction material may be reduced or even totally omitted during stable or steady operation. Only in the beginning of the operation, it may be necessary to feed coke or coal as a heating material in considerable amounts. During stable and continuous operation, reduction of metal ore particularly reduction of metal oxides is finally achieved by means of gaseous CO which is directed from the $CO_2$ converter 4, 104 into the blast furnace shaft 2.

As mentioned above, the furnace gas of the classical blast furnace process has a variable composition of nitrogen ($N_2$, about 52-59%), carbon dioxide ($CO_2$, about 22-24%), carbon monoxide (CO, about 18-21%) and hydrogen ($H_2$, about 1-3%) and further water steam and possibly traces of methane ($CH_4$). In the blast furnace process according to the present disclosure, such a composition may be expected only in the beginning of the operation, since it is considered to blow a considerable amount of air into the blast furnace shaft 2 only for preheating or starting the blast furnace 1.

As soon as a stable operation of the blast furnace 1 is obtained and stable temperatures are present, no substantial amount of air is blown into the blast furnace shaft 2. The furnace gas of the blast furnace process of the present application comprises merely no nitrogen during stable operation, but consists of a variable mixture containing carbon dioxide ($CO_2$, about 50-53%), carbon monoxide (CO, about 42-46%) and hydrogen ($H_2$, about 2-6%) as well as water steam ($H_2O$; depending on the humidity of the ore and optional additives) and possibly traces of methane ($CH_4$). The gases $CO_2$ and CO are formed during conversion of metal ore, however, these gases may also be formed from additives. In practice, there is a variable ratio of CO to $CO_2$ in the furnace gas depending on the construction of the blast furnace, depending on the composition of the iron ore ($Fe_2/O_3$ and/or $Fe_3/O_4$), depending on the process parameters etc.

The furnace gas is hot and therefore raises in the blast furnace shaft 2 during operation. The raising furnace gas is discharged from the first furnace gas outlet 10 and is directed into the $CO_2$ converter 4 via the first furnace gas connection 23. Furthermore, carbon (C particles) is fed into the $CO_2$ converter 4 via the $CO_2$ converter inlet 20. The carbon may simply come from a C storage container, according to FIG. 1. Alternatively, the carbon comes from the hydrocarbon converter 46, as was described with reference to the embodiment of FIG. 4. Optionally, the carbon is mixed with hydrogen ($H_2/C$ aerosol).

Furnace gas, which primarily contains $CO_2$, is directed into the $CO_2$ converter 4 via the $CO_2$ converter gas inlet 22, and the furnace gas is directed over hot carbon or is mixed with the $H_2/C$ aerosol. As mentioned above, the furnace gas primarily consists of $CO_2$ and CO in variable proportions during stable operation of the metallurgical process of the present application. The furnace gas has a temperature of 250 to 400° C. The hot carbon is provided into the $CO_2$ converter 4 via the $CO_2$ converter inlet 20. The $CO_2$ converter 4 works at the Boudouard equilibrium, which is set during conversion of carbon dioxide with hot carbon. The "Boudouard reaction" is known to a skilled person and will not described in detail:

$$CO_2 + C \rightleftharpoons 2CO \quad \Delta H = +172.45 \text{ kJ/mol}$$

As mentioned above, also conversion of possibly present water steam ($H_2O$) takes place in small scale inside the $CO_2$ converter 4 according to the following equation:

$$H_2O + C \rightleftharpoons CO + H_2 \quad \Delta H = +131.4 \text{ kJ/mol}$$

The above mentioned variable proportion of CO and $CO_2$ in the furnace gas will be accommodated by correspondingly controlling the metallurgical process. Particularly, there will be as much carbon (C) provided into the $CO_2$ converter 4 as is necessary for conversion of the carbon dioxide and the water steam. Furthermore, the temperature inside the $CO_2$ converter 4 will be controlled in such a way that a conversion grade as good as possible is achieved. About 94% carbon monoxide will result at temperatures of about 800° C., and about 99% carbon monoxide will be produced at temperatures of about 1000° C. Accordingly, in an ideal case, the carbon dioxide ($CO_2$) is nearly completely converted in presence of the fed carbon (C), and nearly only (99%) CO gas is produced. Due to the carbon fed into the $CO_2$ converter inlet 20, the amount of gas in the circuit between the blast furnace shaft 2 and the $CO_2$ converter 4 doubles averaged over time. Therefore, according to the process of this disclosure, about half of the converted furnace gas is directed from the $CO_2$ converter 4 into the further processing converter 6, i.e. via the second CO outlet 26.

A hot gas mixture exits from the $CO_2$ converter 4, wherein the gas mixture consists nearly completely of carbon monoxide (CO) and has a temperature of about 800° C. to 2000° C. (depending on the operating temperature of the $CO_2$ converter 4). The conversion rate depends on the process control (control of pressure and temperature) as mentioned above. The gas mixture exiting from the $CO_2$ converter will be described as carbon monoxide or CO gas for simplification. The CO gas exiting from the $CO_2$ converter 4 also contains heat energy, which may be directly or indirectly, i.e. via a heat exchanger not shown in FIG. 1, used for preheating e.g. the furnace gas having high $CO_2$ content which is fed into the $CO_2$ converter gas inlet 22.

Half of the CO gases coming from the $CO_2$ converter 4 is directed to the CO inlets 14 at the blast furnace shaft 2 via the CO connection 25. By means of the distributor unit 16, varying amounts of CO gas may be fed at different height heights into the blast furnace shaft 2. As soon as the CO gas returns into the blast furnace shaft 2, a portion of the CO is converted into $CO_2$ in presence of the metal oxide. From the additives and the metal ore, additional $CO_2$ (generated from the additives) and water (originating from the additives and the ore) will be produced. After a certain operating time of the blast furnace 1, the amount of nitrogen decreases since, during continuous stable operation of the metallurgical blast furnace process according to the present disclosure, no new nitrogen from air is fed into the blast furnace shaft. Thus, the furnace gas of the metallurgical process of the present disclosure finally only consists of $CO_2$, CO and $H_2$. The proportions of CO and hydrogen increase according to the following equations:

$$C + CO_2 \rightarrow 2CO$$

$$C + H_2O \rightarrow CO + H_2$$

The CO gas and the hydrogen in the blast furnace shaft 2 function as reduction agent and reduce the metal ore. Optionally, a portion of the CO gas may be introduced below the level of the molten metal.

Optionally, pure carbon may be fed into the molten metal via the C inlet 18, which causes the melting point of the metal to decrease. The carbon fed into the C inlet 18 may come from the same source as the carbon. Preferably, the carbon C comes from the above mentioned hydrocarbon converter 46.

The second portion of the gas mixture or CO gas, respectively, from the $CO_2$ converter 4 is directed to the CO inlet 28 of the further processing converter 6 via the second CO outlet 26 and the CO connection 34.

If the further processing converter 6 is a combustion machine, a combustion process will take place, e.g. in a gas engine or a gas turbine, or an oxidation process, e.g. in a fuel cell. Any required auxiliary agents will be fed via the auxiliary agent inlet 29, wherein these auxiliary agents are necessary for burning or oxidation of the gas mixture or CO gas, respectively. These auxiliary agents may be oxygen or air in the case of a gas engine or a gas turbine or a gas burner, respectively.

If the further processing converter 6 is implemented as a bio converter, a biological conversion process is carried out in the further processing converter 6, wherein the conversion process is carried out using microbes or algae according to the following net equations:

$$6CO + 3H_2O \rightarrow C_2H_5OH + 4CO_2; \quad \text{a)}$$

$$6H_2 + 2CO_2 \rightarrow C_2H_5OH + 3H_2O; \quad \text{b)}$$

$$2CO + 4H_2 \rightarrow C_2H_5OH + H_2O \quad \text{c)}$$

By means of such a biological conversion process, the gases fed into the further processing converter 6 may be converted into kerosene, diesel, gasoline, methanol or another fuel as an end product using microbes or algae. This end product will then exit from the further processing converter outlet 32.

If the further processing converter 6 is a CO converter, functionalized and/or non-functionalized hydrocarbons will be produced in the further processing converter 6. In this case, the further processing converter 6 will be provided with CO from the $CO_2$ converter 4 and with $H_2$ as an auxiliary agent via the auxiliary agent inlet 29, wherein both yield a synthesis gas. Alternatively, if a $H_2/C$ aerosol is fed into the $CO_2$ converter 4, CO and $H_2$ are fed concurrently from the $CO_2$ converter 4 into the further processing converter 6. The produced hydrocarbons are e.g. paraffin, kerosene, diesel, gasoline, wet gases or liquid gases or methanol. In this case, the further processing converter works e.g. according to the Fischer-Tropsch process, according to the Bergius-Pier process or the Pier process, wherein these processes are known to the skilled person and will not be described in detail. In this case, the produced hydrocarbons exit from the further processing converter outlet 32 as an end product.

Depending on the type of the employed further processing converter 6, furnace gas may be fed from the second furnace gas outlet 12 into the furnace gas inlet 30 of the further processing converter 6 via the second furnace gas connection 31. If the further processing converter 6 is a bio converter, as described above, the furnace gas is purified from toxic substances, which might harm the microbes or algae. If the further processing converter 6 is one of the above mentioned CO converters, the furnace gas is purified from substances which might be detrimental for the operation of the chosen CO converter (Fischer-Tropsch converter, Bergius Piers converter etc.).

Operation of the embodiment of the blast furnace 1 according to FIG. 2 takes place in the same way as was described above with respect to the blast furnace of FIG. 1. The converters shown in FIG. 2 can operate in the same way as described above.

However, the operation of the blast furnace 1 according to FIG. 2 differs in that the furnace gas discharged from the first furnace gas outlet 10 is directed into the combustion machine 36 and is burnt with added oxygen. During this burning step in the combustion machine 36, the combustible components of the furnace gas are burnt, i.e. CO and $H_2$. Carbon monoxide (CO) burns to carbon dioxide ($CO_2$), and hydrogen ($H_2$) burns to water steam ($H_2O$). The amount of $H_2O$ is very low. Accordingly, the furnace gas is directed into the $CO_2$ converter 4 only indirectly, since an oxidation step takes place in the combustion machine 36.

As was mentioned above, a considerable amount of nitrogen ($N_2$) may be part of the furnace gases during the initial heating phase of the blast furnace 1. Nitrogen is an inert gas and does not participate in the oxidation step in the combustion machine 36. During continued operation of the blast furnace 1, the proportion of $N_2$ of the furnace gases decreases in the metallurgical process of the present disclosure, since nearly no $N_2$ is directed into the blast furnace shaft 2 after a certain time in operation. After the burning or oxidation step of the CO contained in the furnace gases, the exhaust gas mixture discharged from the combustion machine 36 primarily consists of $CO_2$, i.e. the amount of $CO_2$ contained in the furnace gases before the oxidation step and the amount of $CO_2$ resulting from burnt CO. This exhaust gas mixture containing $CO_2$ will be fed into the $CO_2$ converter gas inlet 22 via the exhaust gas connection 41. In the $CO_2$ converter 4, the exhaust gas containing $CO_2$ will be reduced to CO in presence of added C, as was described above.

The other operation steps of the embodiment according to FIG. 2 correspond to the operation described above with respect to FIG. 1, and this description is not repeated for brevity.

As was mentioned above, it is considered to optionally direct a portion of the exhaust gas containing $CO_2$ into the further processing converter 6 via the second exhaust gas connection 42. In this way, a desired ratio of CO to $CO_2$ may be provided for the further processing converter 6. This may be in particular an advantage if the further processing converter 6 is a bio converter which uses microbes or algae.

The operation of the embodiment according to FIG. 3 also takes place in similar manner as described above with respect to the embodiment of FIG. 1, and thus the operation steps will not be entirely repeated.

During operation of the blast furnace 1 according to FIG. 3, CO gas produced in the $CO_2$ converter 4 is directed from the second CO outlet 26 into the combustion machine 36. In the combustion machine 36, the CO fed thereto is burned into $CO_2$ with added oxygen. Operation of the embodiment according to FIG. 3 differs in that a portion of the CO gases from the $CO_2$ converter 4 is routed only indirectly into the further processing converter 6 since an oxidation step takes place in the combustion machine 36. Exhaust gases containing $CO_2$ are discharged from the exhaust gas outlet 40 of the combustion machine 36, and the exhaust gases containing $CO_2$ are directed into the further processing converter 6 via the exhaust gas connection 41.

In this case, the further processing converter 6 operates nearly completely with $CO_2$ and corresponding auxiliary agents, which are introduced via the auxiliary agent input 29 and the optionally provided furnace gas input 30. In the embodiment of FIG. 3, the further processing converter 6 is a bio converter, which operates using algae or microbes. In this embodiment, preferably hydrogen, water or CO are considered as auxiliary agents. Hydrogen may be provided as an auxiliary agent from a storage container or from the hydrocarbon converter 46 as described below. Additionally, CO may be provided as an auxiliary agent and may be a portion of the furnace gas which is directed into the further processing converter 6 via the second furnace gas outlet 12 and the second furnace gas connection 31. In this case, the products produced in the biological conversion process are discharged from the further processing converter outlet 32, i.e. ethanol ($C_2H_5OH$ or $C_2H_6O$) and $H_2O$.

Operation of the blast furnace 1 shown in FIG. 4 is carried out in a similar way as described above for the other embodiments. The converters shown in FIG. 4 are able to operate in the same way as described above.

In the embodiment of FIG. 4, the carbon, which is fed into the $CO_2$ converter 4 via the C inlet 20, is produced by the above described hydrocarbon converter 46. The hydrocarbon converter 46 further produces hydrogen ($H_2$) which may be directed into the auxiliary agent input 29 of the further processing converter 6 as an auxiliary agent. Alternatively, at least a portion of the hydrogen is directed into the $CO_2$ converter 4 concurrently with the carbon, e.g. as a $H_2/C$ aerosol (not shown in the figures). This portion of the hydrogen is directed into the further processing converter 6 together with the CO from the $CO_2$ converter 4.

The hydrocarbon converter 46 operates as follows: feedstock containing hydrocarbon is fed into the hydrocarbon converter 46 via the hydrocarbon inlet 48. If the hydrocarbon is e.g. methane ($CH_4$), 1 mol carbon and 2 mol hydrogen are produced from 1 mol methane. The hydrocarbon converter 46 is able to decompose the materials containing hydrocarbons by means of a known thermal process, e.g. via pyrolysis. Alternatively, the raw materials or feedstock containing hydrocarbons are decomposed with the help of a plasma, e.g. by means of a Kvaerner process. In a decomposition step with the help of a plasma in a plasma burner of the hydrocarbon converter 46, hydrocarbons are converted at a temperature of about 1600° C. according to the following reaction wherein the energy for the plasma burner is electrically energy and the plasma burner produces thermal energy:

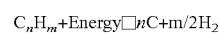

$$C_nH_m + \text{Energy} \rightarrow nC + m/2 H_2$$

An efficiency of the conversion or decomposition process of nearly 100% may be achieved because of the high energy content of the chemical products and the high temperature.

The resulting carbon is at least partially directed into the $CO_2$ converter 4 via the C inlet 20. Since the carbon discharged from the hydrocarbon converter 46 has a high temperature, at least a portion of the heat energy of the carbon may be used for heating or powering the conversion processes inside the $CO_2$ converter 4, wherein the $CO_2$ converter preferably works at a temperature of about 1000° C. Optionally, the carbon may be mixed with hydrogen ($H_2$/C aerosol) and may be directed into the $CO_2$ converter 4, wherein the hydrogen is an additional energy carrier.

The C connection 56 between the hydrocarbon converter 46 and the $CO_2$ converter 4 is formed in such a way that the carbon does not cool down too much on the way from the hydrocarbon converter 46 to the $CO_2$ converter 4. The C connection 56 may be e.g. isolated and/or heated. The hydrogen produced in the hydrocarbon converter 46 also contains heat energy due to the high operating temperature inside the hydrocarbon converter 46. Therefore, one possibility for heating the C connection 56 is to use the heat energy of the hydrogen coming from the hydrogen output 52 for heating the C connection 56 between the hydrocarbon converter 46 and the $CO_2$ converter 4 either directly or indirectly by means of a heat exchanger. In this way it is possible to convert the hot carbon from the hydrocarbon converter 46 into carbon monoxide with added warm or hot carbon dioxide from the furnace gases or exhaust gases containing $CO_2$ inside the $CO_2$ converter 4 without any considerable energy input.

As mentioned above, a portion of the carbon produced in the hydrocarbon converter 46 may be discharged via the second C outlet 54 and may be sold as an end product or may be directed into the blast furnace shaft 2 via the C inlet 18. Alternatively, the carbon may be burnt in one of the combustion machines 36 or may be blown into the blast furnace shaft 2 as a reduction agent or may be burnt for producing heat energy.

In the embodiment of FIG. 4 again the further processing converter 6 may be a combustion machine, a bio converter or a CO converter for producing functionalized and/or non-functionalized hydrocarbons, as was described above with respect to the embodiments of FIGS. 1 to 3. Operation of the different implementations of the further processing converter 6 is similar to the operation described above for the other embodiments.

In all embodiments, the gases fed into the further processing converter 6 may be introduced either directly or via a mixer not shown in the figures. Depending on the desired composition of the synthesis gas, a desired ratio of hydrogen to CO may be adjusted in such a mixer and may be discharged at a synthesis gas outlet of the mixer. If not the entire available CO stream and the entire available $H_2$ stream can be used in the mixer, the portions of the pure gases CO or $H_2$ not used in the mixer may be separately further processed.

In all embodiments, furnace gas may optionally be directed from the second furnace gas outlet 12 into the further processing converter 6 via the second furnace gas connection 31. Depending on the type of the further processing converter 6, the furnace gas is cleaned from detrimental substances.

Furthermore, in all embodiments, where a combustion machine 36 is located between the blast furnace shaft 2 and the $CO_2$ converter 4, a portion of the exhaust gases containing $CO_2$ may be directly routed into the further processing converter 6 via the second exhaust gas connection 42, i.e. bypassing the $CO_2$ converter 4.

In the following, operation of the embodiment according to FIG. 5 is described. The processes inside the blast furnace shaft 2 are the same as described above with respect to the embodiment of FIG. 1. Accordingly, the processes inside the blast furnace shaft 2 are not repeated. The furnace gas discharged from the blast furnace shaft 2 is either directly routed into the alternative RWS $CO_2$ converter 104 or is routed indirectly through an intermediate combustion machine 36 into the RWS $CO_2$ converter 104 in form of exhaust gas containing $CO_2$. As in the previous embodiments, the indirect way through the combustion machine 36 and the burning or oxidation step therein are optional.

Different from the embodiments of FIGS. 1 to 4, the furnace gas or the exhaust gas containing $CO_2$ is not mixed with carbon but instead with hydrogen inside the RWS $CO_2$ converter 104, wherein the hydrogen is fed into the $CO_2$ converter inlet 120. The hydrogen comes from the hydrocarbon converter 46 shown in FIG. 5. Alternatively, the hydrogen may simply come from a storage container. The hydrocarbon converter 46 operates in the same way as described above with reference to the other embodiments of FIGS. 1 to 4. The hydrogen ($H_2$) produced in the hydrocarbon converter 46 is fed into the RWS $CO_2$ converter 104 and reacts therein with the $CO_2$ from the exhaust gas or from the furnace gas so as to form a mixture of CO and $H_2O$ according to the Reverse-Water-Shift reaction: $CO_2 + H_2 \rightarrow CO + H_2O$. If also water steam ($H_2O$) enters into the RWS $CO_2$ converter 104 together with the furnace gas or with the exhaust gas containing $CO_2$, the $H_2O$ is chemically neutral and does not participate in the Reverse-Water-Shift reaction.

The CO/$H_2O$ mixture is discharged from the RWS $CO_2$ converter 104 from the $CO_2$ converter outlet 124. The CO/$H_2O$ mixture is directed through the water separator 128, wherein $H_2O$ is separated in the water separator 128 and is drained from the $H_2O$ outlet 132. The remaining CO gas is discharged from the CO outlet 134 of the water separator 128 and is directed into the blast furnace shaft 2 via the CO connection 25. The CO/$H_2O$ mixture may alternatively be directed into the blast furnace shaft 2 via the CO connection 25 (not shown in FIG. 4).

As far as the hydrocarbon converter 46 produces excess $H_2$ gas, which cannot be converted in presence of $CO_2$ inside the $CO_2$ converter, said excess $H_2$ may be stored and sold as a product. Alternatively, such excess $H_2$ may be used for powering the above mentioned auxiliary heater for the blast furnace shaft 2.

The carbon produced inside the hydrocarbon converter 46 and not used in the RWS $CO_2$ converter 104 may be sold as a product, i.e. carbon black or activated carbon. Alternatively or additionally, excess carbon may be partially introduced into the molten metal via the C inlet 18 so as to reduce the melting point. Furthermore, the produced carbon may also be blown into the blast furnace shaft 2 or may be used for powering the auxiliary heater or the blast furnace shaft 2.

The embodiment of FIG. 5 does not comprise a further processing converter, since the $CO_2$ contained in the furnace gas is converted into CO according to the Reverse-Water-Shift reaction, i.e. no carbon (C) is added. Thus, the amount of gas in the circuit between the blast furnace shaft 2 and the RWS $CO_2$ converter 104 is not doubled as was described above with reference to FIGS. 1 to 4. Thus, further processing of excess CO in a further processing converter is not useful in the embodiment of FIG. 5.

Depending on the size of the converter and of the entire blast furnace 1, more than one $CO_2$ converter 4, 104, more than one combustion machine 36 and more than one further processing converter 6 may be operated in the above referenced way in all embodiments. Furthermore, the further processing converters 6 may carry out the different operations mentioned above, i.e. a bio converter may be operated in parallel with a Bergius-Pier converter or with a Fischer-Tropsch converter.

In all embodiments of FIGS. 1 to 5, the blast furnace shaft 2 or the $CO_2$ converter 4, 104 may be heated with heat from an auxiliary heater. The temperature in the lower portion of the blast furnace shaft 2 should be sufficient to hold the metal in a molten state. The temperature inside the $CO_2$ converter 4, 104 should be sufficient to achieve a possibly complete conversion of the $CO_2$ into CO. The heat for the auxiliary heater is preferably produced by combustion in one of the combustion machines 36 or in a further processing converter 6 in form of a combustion machine. Alternatively, waste heat resulting from operation of the hydrocarbon converter 46 may be used. As mentioned above, the hydrocarbon converter 46 operates at high temperatures, particularly if the hydrocarbon converter is implemented as a high temperature plasma converter. The waste heat may be directed to the blast furnace shaft 2 and/or to the $CO_2$ converter 4 by means of heat exchangers or by routing streams of raw material, which are routed in close contact to each other.

If a hydrocarbon converter 46 operating at low temperature is used (e.g. a thermal energy converter or a low temperature plasma converter) it may be only necessary to provide an auxiliary heater at the $CO_2$ converter 4 if the conversion of $CO_2$ into CO inside the $CO_2$ converter 4 would be too incomplete, i.e. too little $CO_2$ would be converted into CO, due to the operating temperature being too low (i.e. below 800° C.). While about 94% carbon monoxide is provided at temperatures of 800° C., the conversion rate strongly decreases below this temperature. Since already about 99% carbon monoxide is provided at temperatures of about 1000° C., it would be less useful to heat the $CO_2$ converter 4 much more (e.g. to more than 1700° C.), since half of the thermal energy gets lost as the CO gas is discharged from the second CO outlet 26. At least in the lower region of the blast furnace shaft 2 the temperature should be between 1000° C. and 1300° C., since the reduced metal (pig iron) is molten at that temperature and may be discharged or tapped. If the blast furnace shaft 2 is not sufficiently heated by hot introduced CO gas, and if, accordingly, lower temperatures prevail, it would be useful to employ an auxiliary heater at the blast furnace shaft 2.

If a hydrocarbon converter 46 operating at high temperature is used, the hydrocarbon converter 46 already provides carbon at a temperature between 900° C. and 1700° C. into the $CO_2$ converter 4 (the temperature ranges from 1500° C. to 1700° C. for a high temperature plasma reactor). Thus, an operating temperature of the $CO_2$ converter 4 of up to 1700° C. may be useful. An auxiliary heater for the $CO_2$ converter 4 would not be necessary in this case.

Figure 6:
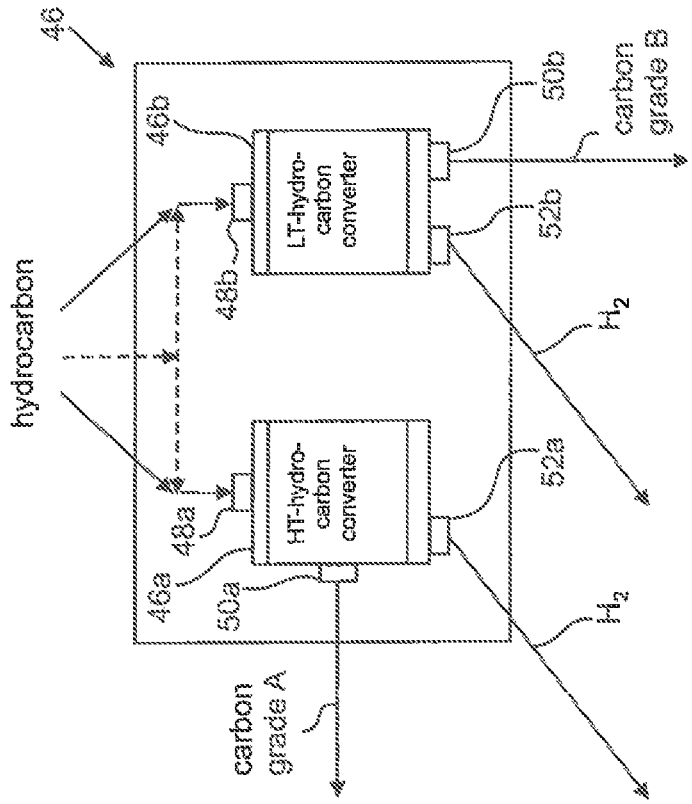
FIG. 6 is a schematic illustration of a hydrocarbon converter which may be used in a blast furnace according to one of the first to fifth embodiments.

Depending on the size of the blast furnace, it is also considered to operate a plurality of hydrocarbon converters 46 in parallel, so as to provide the desired capacity for converting or decomposing. In all embodiments, the hydrocarbon converter 46 may be a combination of a plurality of hydrocarbon converters 46a, 46b operating in parallel, as shown in FIG. 6, e.g. a combination of a high temperature hydrocarbon converter 46a (having a hydrocarbon inlet 48a, a C outlet 50a and a H2 outlet 52a) and a low temperature hydrocarbon converter 46b (having a hydrocarbon inlet 48b, a C outlet 50b and a H2 outlet 52b). A high temperature hydrocarbon converter operates at a temperature of more than 1000° C., and a low temperature hydrocarbon converter operates at a temperature between 200° C. and 1000° C. The hydrocarbons to be decomposed may be fed into the high temperature and low temperature hydrocarbon converters 46a, 46b via a common feeding line or via separate feeding lines. A hydrocarbon converter 46 comprising a plurality of smaller modules is advantageous in that different hydrocarbons or different proportions of hydrocarbons may be decomposed with ideal processing parameters. Furthermore, the individual high temperature or low temperature hydrocarbon converters may produce different grades or types of carbon, e.g. one type for saleable products and another type for use in the blast furnace shaft.

The above mentioned embodiments have been described for ideal conditions. It will be obvious that, in a practical implementation, varying proportions of hydrogen, $CO_2$, CO and $N_2$ will be present in the furnace gas. Therefore, also varying streams of CO gas or synthesis gas, respectively, will be discharged from the $CO_2$ converter 4. Nevertheless, the composition of a synthesis gas to be further processed in the further processing converter 6 may be maintained constant by means of a mixer. Thus, a synthesis gas having nearly constant composition may be provided for the further processing converter 6.

If a further processing converter 6 uses microbes or algae, minor variations of the delivered gas mixture may, however, be compensated for by the microbes or algae. The following examples relate to situations which may arise if varying proportions of the involved gases or raw materials are converted:

Example 1

50% of the CO provided into the blast furnace shaft 2 are converted into $CO_2$ (total result for CO without the discharged metal (Fe)):

$$2CO + \tfrac{1}{2} \rightarrow CO + CO_2$$

The gases CO and $CO_2$ are directed into the $CO_2$ converter 4 as furnace gas. In the $CO_2$ converter 4 (reduction with C; Boudouard) the following reaction takes place:

$$3CO_2 + 3CO + 3C \rightarrow 9CO$$

In other words: furnace gas+3C→9 CO

In the hydrocarbon converter 46 (in this case a plasma converter, particularly a Kvaerner reactor), the following reaction takes place:

$$3CH_4 \rightarrow 3C + 6H_2$$

Thus, the entire produced hydrogen (6 mol $H_2$) is used in the further processing converter 6 (in this case a CO converter for producing hydrocarbons). The entire produced carbon (3 mol C) is directed into the $CO_2$ converter 4.

Subsequently, two thirds of the carbon monoxide (6 mol CO) of the entire 9 mol CO produced inside the $CO_2$ converter 4 are redirected into the blast furnace shaft 2. The remaining third of the carbon monoxide (3 mol CO) is fed into the further processing converter 6 (in this case a CO converter) together with the hydrogen from the hydrocarbon converter 46 in form of a synthesis gas. The hydrogen (6 mol $H_2$) is fed into the further processing converter 6 as an auxiliary agent (or may be fed into the further processing converter 6 via the $CO_2$ converter 4, if the carbon is fed into the $CO_2$ converter 4 in form of an $H_2/C$ aerosol).

Summarized, the following reactions occur example 1:

1. Blast furnace shaft 2:

$$Fe_2O_3 + 6CO \rightarrow 2Fe + 3CO_2 + 3CO$$

2. Carbon converter 46 (here Kvaerner reactor):

$$3CH_4 \rightarrow 3C + 6H_2$$

3. $CO_2$ converter 4 (here Boudouard):

$$3CO_2 + 3CO + 3C \rightarrow 9CO$$

4. Further processing converter 6 (here conversion of synthesis gas in the CO converter):

$$3CO+6H_2 \rightarrow 3(CH_2)n+3H_2O$$

Example 2

75% of the CO provided into the blast furnace shaft 2 are converted into $CO_2$ (overall result for CO without the discharged metal (Fe)):

$$4CO+3/2O_2 \rightarrow CO+3CO_2$$

The gases CO and $CO_2$ are directed into the $CO_2$ converter 4 as a furnace gas. Inside the $CO_2$ converter (reduction with C; Boudouard) the following reaction takes place:

$$3CO_2+CO+3C \rightarrow 7CO$$

In other words: furnace gas+3C→7 CO

Inside the hydrocarbon inverter 46 (in this case a plasma converter, particularly a Kvaerner reactor) the following reaction takes place:

$$3CH_4 \rightarrow 3C+6H_2$$

Thereafter, four seventh of the carbon monoxide (4 mol CO) of the 7 mol CO produced in the $CO_2$ converter 4 are redirected into the blast furnace shaft 2. The remaining three seventh of the carbon monoxide (3 mol CO) are fed into the further processing converter 6 (here CO converter) together with the hydrogen (6 mol $H_2$) from the hydrocarbon converter 46 in form of a synthesis gas. The hydrogen is fed into the further processing converter as an auxiliary agent (or the hydrogen is directed into the further processing converter 6 via the $CO_2$ converter 4, if the carbon is directed into the $CO_2$ converter 4 in form of a $H_2/C$ aerosol).

Summarized the following reactions occur in example 2:
1. Blast furnace shaft 2:

$$Fe_2O_3+4CO \rightarrow 2Fe+3CO_2+CO$$

2. Hydrocarbon converter 46 (here Kvaerner reactor):

$$3CH_4 \rightarrow 3C+6H_2$$

3. $CO_2$ converter 4 (here Boudouard):

$$3CO_2+CO+3C \rightarrow 7CO$$

4. Further processing converter 6 (here conversion of synthesis gas in a CO converter:

$$3CO+6H_2 \rightarrow 3(CH_2)n+3H_2O$$

Example 3

100% of the CO fed into the blast furnace shaft 2 are converted into $CO_2$ (total result for CO without the discharged metal (Fe)):

$$2CO+O_2 \rightarrow 2CO_2$$

$CO_2$ is directed into the $CO_2$ converter 4 as a furnace gas. Inside the $CO_2$ converter 4 (reduction with C; Boudouard) the following reaction takes place:

$$2CO_2+2C \rightarrow 4CO$$

In other words: furnace gas+2C→4 CO

One half of the carbon monoxide produced in the $CO_2$ converter 4 is redirected into the blast furnace shaft 2. The other half of the carbon monoxide is directed into the further processing converter 6 (in this case a bio converter) concurrently with the hydrogen from the hydrocarbon converter 46 (in this case a plasma converter) in form of a synthesis gas.

In the hydrocarbon converter 46 (here a plasma converter, particularly a Kvaerner reactor), the following reaction takes place:

$$12CH_4 \rightarrow 12C+24H_2$$

Thus, all of the produced hydrogen (24 mol $H_2$) is used in the further processing converter 6. All of the produced carbon (12 mol C) is directed into the $CO_2$ converter 4.

Summarized, the following reactions occur in example 3:
1. Blast furnace shaft 2:

$$4Fe_2O_3+12CO \rightarrow 8Fe+12CO_2$$

2. Hydrocarbon converter 46 (here Kvaerner reactor):

$$12CH_4 \rightarrow 12C+24H_2$$

3. $CO_2$ converter 4 (here Boudouard):

$$12C+12CO_2 \rightarrow 24CO$$

4. Further processing converter 6 (here bio converter):

$$24H_2+12CO \rightarrow 6C_2H_5OH+18H_2O$$

Example 4

100% of the CO fed into the blast furnace shaft 2 are converted into $CO_2$ (total result for CO without the discharged metal (Fe)):

$$2CO+O_2 \rightarrow 2CO_2$$

Thereafter, the $CO_2$ coming from the blast furnace shaft 2 is divided. On half of the $CO_2$ is directed into the $CO_2$ converter 4. The other half of the $CO_2$ from the blast furnace shaft 2 is directed into the further processing converter 6 (here bio converter) via the second furnace gas connection 31. Said second portion or second half of the $CO_2$ (representing a first auxiliary agent) is provided to the further processing converter 6 together with the hydrogen (representing a second auxiliary agent) from the hydrocarbon converter 46 (in this case a Kvaerner reactor) as a synthesis gas.

In the $CO_2$ converter 4 (reduction with C; Boudouard) the following reaction occurs:

$$2CO_2+2C \rightarrow 4CO$$

In other words: furnace gas+2C→4 CO

In the hydrocarbon converter 46 (here a plasma converter, particularly a Kvaerner reactor), the following reaction takes place:

$$9CH_4 \rightarrow 9C+18H_2$$

Therefore, all of the produced hydrogen (18 mol $H_2$) is used in the further processing converter 6. Two thirds of the produced carbon (6 mol C) are directed into the $CO_2$ converter 4. The remaining third of the carbon (3 mol C) is available as an end product, e.g. for trade or for use in the method for processing metal ore of the present application.

Summarized, the following reaction occur in example 4:
1. Blast furnace shaft 2:

$$4Fe_2O_3+12CO \rightarrow 8Fe+12CO_2$$

2. Hydrocarbon converter 46 (here Kvaerner reactor):

$$9CH_4 \rightarrow 9C+18H_2$$

3. $CO_2$ converter 4 (here Boudouard):

$$6C+6CO_2 \rightarrow 12CO$$

4. Further processing converter 6 (here bio converter):

$$18H_2+6CO \rightarrow 3C_2H_5OH+9H_2O$$

Alternatively, in all examples, the synthesis gas consisting of CO and $H_2$ may be converted into functionalized and/or non-functionalized hydrocarbons in a CO converter, as was described above.

Comparison of Examples 3 and 4

When comparing example 3 (syngas route) and example 4 ($CO_2$ route), it will be recognized that in example 3 a higher yield of products (ethanol) is produced in the bio converter, provided the same amount of pig iron is produced from the same iron ore hematite ($Fe_2O_3$). For yielding the double amount of ethanol in example 3, however, one third more methane needs to be decomposed. Furthermore, the additionally available carbon (3 mol C), which is available in example 4 and may be used for lowering the melting point of the raw metal (pig iron) if introduced via the C inlet 18, is not yielded. In both cases, the carbon of the ethanol (and the carbon forming the carbon products or pure carbons) is entirely produced from the (fossil) methane, which is provided from the outside. However, example 4 has the advantage that 100% of the carbon converted in the bio converter indeed comes from the $CO_2$ emitted by the blast furnace shaft 2. Thus, example 4 is advantageous since it avoids $CO_2$. It is a question of economics, if rather more methane shall be fed into the process and thus more ethanol may be produced (example 3) or whether rather less ethanol shall be produced but instead additional carbon (C) shall be produced (example 4).

Furthermore, it becomes apparent that the process control for the entire method of the present disclosure may be flexibly adapted to the processes in the blast furnace shaft 2. Since the method for processing metal ore is implemented in a circuit, the amount of raw materials or products finally depends on the raw metal production (pig iron production) and the metal ore (iron ore) which is used:

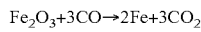

$Fe_2O_3 + 3CO \rightarrow 2Fe + 3CO_2$

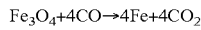

$Fe_3O_4 + 4CO \rightarrow 4Fe + 4CO_2$

If hematite ($Fe_2O_3$) is used, more CO per ton of raw iron is necessary compares to the use of magnetite ($Fe_3O_4$) as an ore. Accordingly, hematite finally yields also more end products in the further processing converter 6 (e.g. in a bio converter) than magnetite.

The invention was described based on preferred embodiments, wherein individual features of the described embodiments may be combined freely and/or may be substituted as far as these features are compatible. Furthermore, individual features of the described embodiments may be omitted as long as these features are not essential. Thus, those skilled in the art will appreciate that various modifications and practical implementations are possible and obvious without departing from the full and fair scope of the present invention.

The invention claimed is:

1. A method for processing metal ore comprising the following steps:
reducing a metal ore and thereby producing furnace gas containing $CO_2$ in a blast furnace shaft (2);
discharging said furnace gas from the blast furnace shaft (2);
directing at least a portion of the furnace gas directly or indirectly into a $CO_2$ converter (4) and reducing the $CO_2$ contained in the furnace gas to CO in the $CO_2$ converter (4), wherein the step of reducing the $CO_2$ to CO is carried out inside the $CO_2$ converter by addition of C at a temperature in the region of 800° C. to 1700° C.;
directing a first portion of the CO from the $CO_2$ converter (4) into the blast furnace shaft (2);
directing a second portion of the CO from the $CO_2$ converter (4) into a further processing process, wherein the further processing process comprises
a conversion process converting synthesis gas into a functionalized or non-functionalized hydrocarbon, and wherein the synthesis gas is produced by the following steps:
decomposing a fluid containing hydrocarbons into C and hydrogen by at least one of a plasma process and the introduction of thermal energy; and
mixing at least a portion of the hydrogen with at least a portion of the CO produced in the $CO_2$ converter (4).

2. The method according to claim 1, wherein the second portion of the CO coming from the $CO_2$ converter (4) is burnt so as to form an exhaust gas mixture containing $CO_2$ before it is directed to the further processing process in the form of said exhaust gas mixture.

3. The method according to claim 1, wherein, in a case of indirectly directing the furnace gas into the $CO_2$ converter (4), said furnace gas is first burnt to produce an exhaust gas mixture containing $CO_2$ before it is directed into the $CO_2$ converter (4) in the form of said exhaust gas mixture, and is reduced to CO in the $CO_2$ converter (4).

4. The method according to claim 3, which comprises a step of directing a portion of the exhaust gas mixture containing $CO_2$ into the further processing process, bypassing said $CO_2$ converter (4).

5. The method according to claim 1, wherein a portion of the furnace gas is directly routed to a further processing process bypassing the $CO_2$ converter (4).

6. The method according to claim 1, wherein molten metal is formed in the blast furnace shaft (2) by reducing the metal ore, and wherein a portion of the CO is fed into the blast furnace shaft (2) at a lower region thereof above a level of the molten metal in the blast furnace shaft (2).

7. The method according to claim 1, wherein a portion of the CO is fed into the blast furnace shaft (2) at one or more CO inlets located along the blast furnace shaft (2).

8. The method according to claim 7, wherein molten metal is formed in the blast furnace shaft (2) by reducing the metal ore, and wherein the CO inlets are partially located below a level of the molten metal in the blast furnace shaft (2).

9. The method according to claim 1, wherein molten metal is formed in the blast furnace shaft (2) by reducing the metal ore, and wherein additional C is fed into a lower region of the blast furnace shaft (2), such that the C comes into contact with molten metal in the blast furnace shaft (2).

10. The method according to claim 1, wherein the decomposing step is carried out in a separate hydrocarbon converter (46).

11. The method according to claim 1, wherein at least one of the blast furnace shaft (2) and the $CO_2$ converter (4) is additionally heated.

12. The method according to claim 11, wherein the additional heating is carried out at least partially with heat produced in at least one of
an exhaust gas mixture containing $CO_2$ resulting from burning the second portion of the CO coming from the $CO_2$ converter (4);
an exhaust gas mixture containing $CO_2$ resulting from burning furnace gas directed into the $CO_2$ converter (4);

decomposing, with a hydrocarbon cover (46), a fluid containing hydrocarbons into C and hydrogen by means of a plasma or by introducing thermal energy and mixing at least a portion of the hydrogen with at least a portion of the CO produced in the $CO_2$ converter (4).

13. Blast furnace (1) for metal production from metal ore which comprises:
a blast furnace shaft (2) adapted for reducing metal ore having a feeder (8) for metal ore located at the upper end of the blast furnace shaft (2), a first furnace gas outlet (10) and at least one CO inlet (14);
a $CO_2$ converter (4), which comprises a $CO_2$ converter inlet (20) and a $CO_2$ converter gas inlet (22) for gases containing $CO_2$ and which is adapted to reduce $CO_2$ to CO by addition of C at a temperature of between 800° C. and 1700° C.;
wherein the first furnace gas outlet (10) is directly or indirectly connected to the $CO_2$ converter gas inlet (22);
wherein the $CO_2$ converter (4) comprises at least one first CO outlet (24) for discharging a first portion of the CO produced in the $CO_2$ converter (4), wherein said first $CO_2$ outlet (24) is directly or indirectly connected to the blast furnace shaft (2);
wherein the $CO_2$ converter (4) comprises at least one second CO outlet (26) for discharging a second portion of the CO to
a further processing converter (6) which is adapted to produce functionalized or non-functionalized hydrocarbons from a synthesis gas, and
a hydrocarbon converter (46) operated by means of a plasma or by means of thermal energy, wherein the hydrocarbon converter (46) comprises at least one hydrocarbon inlet (48) for a fluid containing hydrocarbons as well as at least one outlet (50, 54, 50/52) for at least C; and wherein at least one of the outlets (50, 54, 50/52) for at least C is connected to the $CO_2$ converter inlet (20) of the $CO_2$ converter (4).

14. The blast furnace (1) according to claim 13, comprising a combustion machine (36) having a combustion gas inlet (38) and at least one exhaust gas outlet (40) for discharging exhaust gases containing $CO_2$;
wherein at least one of the second CO outlets (26) of the $CO_2$ converter (4) is connected to the combustion gas inlet (38) of the combustion machine (36);
wherein the combustion machine (36) is at least partially operated with CO from the $CO_2$ converter (4); and
wherein one of the exhaust gas outlets (40) of the combustion machine (36) is connected to the further processing converter (6).

15. The blast furnace (1) according to claim 13, which comprises a combustion machine (36) having a combustion gas inlet (38) and at least one exhaust gas outlet (40) for discharging exhaust gases containing $CO_2$;
wherein, in an indirect connection of the furnace gas outlet (10) and the $CO_2$ converter (4), the first furnace gas outlet (10) of the blast furnace shaft (2) is connected to the combustion gas inlet (38) of the combustion machine (36); and
wherein the combustion machine (36) is at least partially operated with furnace gas.

16. The blast furnace (1) according to claim 15, wherein one of the exhaust gas outlets (40) of the combustion machine (36) is connected to the $CO_2$ converter gas inlet (22) of the $CO_2$ converter (4) for directing a portion of the exhaust gas mixture containing $CO_2$ into the $CO_2$ converter (4).

17. The blast furnace (1) according to claim 15, wherein one of the exhaust gas outlets (40) of the combustion machine (36) is connected to the further processing converter (6) so as to direct a portion of the exhaust gas mixture containing $CO_2$ to a further processing process in the further processing converter (6), bypassing the $CO_2$ converter (4).

18. The blast furnace (1) according to claim 13, wherein at least one of the second CO outlets (24, 26) of the $CO_2$ converter (4) is connected to the further processing converter (6).

19. The blast furnace (1) according to claim 13, comprising a second furnace gas outlet (12), which is directly connected to the further processing converter (6), bypassing the $CO_2$ converter (4).

20. The blast furnace (1) according to claim 13, wherein the blast furnace shaft (2) is adapted to collect molten metal produced from the metal ore at the bottom of the blast furnace shaft (2), and wherein the blast furnace (1) comprises CO inlet (14) in a lower region of the blast furnace shaft (2) above a level of the molten metal in the blast furnace shaft (2) during operation of the blast furnace (1).

21. The blast furnace (1) according to claim 13, which comprises a plurality of CO inlets (14) at different heights of the blast furnace shaft (2).

22. The blast furnace (1) according to claim 21, wherein the blast furnace shaft (2) is adapted to collect molten metal produced from the metal ore at the bottom of the blast furnace shaft (2), and wherein the CO inlets (14) are partially located at a height which is below a level of the molten metal in the blast furnace shaft (2) during operation of the blast furnace (1).

23. The blast furnace (1) according to claim 13, comprising a C inlet (18) for C in the lower region of the blast furnace shaft (2), wherein the C inlet is located in such a way that C may be fed into the blast furnace shaft (2) below a level of the molten metal during operation of the blast furnace (1).

24. The blast furnace (1) according to claim 13, wherein the hydrocarbon converter (46) comprises at least one $H_2$ outlet (52) for hydrogen ($H_2$).

25. The blast furnace (1) according to claim 24, wherein one of the $H_2$ outlets (52) for hydrogen ($H_2$) of the hydrocarbon converter (46) is connected to the further processing converter (6).

26. The blast furnace (1) according to claim 13, wherein the further processing converter (6) is adapted to produce functionalized or non-functionalized hydrocarbons from a synthesis gas, and wherein the synthesis gas is a mixture of hydrogen from the hydrocarbon converter and CO from the $CO_2$ converter.

27. The blast furnace (1) according to claim 13, which further comprises an auxiliary heater adapted to heat a reduction zone and/or a melting zone of the blast furnace shaft (2) or the $CO_2$ converter (4).

28. The blast furnace (1) according to claim 27, wherein the auxiliary heater uses heat produced in at least one of:
a combustion machine (36) having a combustion gas inlet (38) and at least one exhaust gas outlet (40) for discharging exhaust gases containing $CO_2$, wherein at least one of the second CO outlets (26) of the $CO_2$ converter (4) is connected to the combustion gas inlet (38) of the combustion machine (36), and wherein the combustion machine (36) is adapted to be at least partially operated with CO from the $CO_2$ converter (4), and wherein one of the exhaust gas outlets (40) of the combustion machine (36) is connected to the further processing converter (6); or a combustion machine (36) having a combustion gas inlet (38) and at least one exhaust gas outlet (40) for discharging exhaust gases containing $CO_2$, wherein, in an indirect connection of the furnace gas outlet (10) and the $CO_2$ converter (4), the first furnace gas outlet (10) of the blast furnace shaft (2) is connected to the combustion gas inlet (38) of the combustion machine (36), and wherein the combustion machine (36) is at least partially operated with furnace gas.

29. The blast furnace (1) according to claim 13, which further comprises an auxiliary heater adapted to heat a reduction zone and/or a melting zone of the blast furnace shaft (2) or the $CO_2$ converter (4), wherein the auxiliary heater uses heat produced in the hydrocarbon converter (46).

* * * * *